US012424004B2

(12) United States Patent
Stonehouse

(10) Patent No.: US 12,424,004 B2
(45) Date of Patent: Sep. 23, 2025

(54) ARTIFICIAL INTELLIGENCE BASED STEGANOGRAPHIC SYSTEMS AND METHODS FOR ANALYZING PIXEL DATA OF A PRODUCT TO DETECT PRODUCT COUNTERFEITING

(71) Applicant: The Procter & Gamble Company, Cincinnati, OH (US)

(72) Inventor: Jonathan Richard Stonehouse, Windlesham (GB)

(73) Assignee: The Procter & Gamble Company, Cincinnati, OH (US)

(*) Notice: Subject to any disclaimer, the term of this patent is extended or adjusted under 35 U.S.C. 154(b) by 354 days.

(21) Appl. No.: 17/671,647

(22) Filed: Feb. 15, 2022

(65) Prior Publication Data

US 2022/0292856 A1 Sep. 15, 2022

Related U.S. Application Data

(60) Provisional application No. 63/160,994, filed on Mar. 15, 2021.

(51) Int. Cl.
*G06K 9/00* (2022.01)
*G06F 3/12* (2006.01)
(Continued)

(52) U.S. Cl.
CPC ............ *G06V 20/95* (2022.01); *G06F 3/1268* (2013.01); *G06F 18/214* (2023.01);
(Continued)

(58) Field of Classification Search
CPC ..... G06V 10/44; G06V 10/82; G06F 18/2431
See application file for complete search history.

(56) References Cited

U.S. PATENT DOCUMENTS 8,703,068 B1 4/2014 Stonehouse et al.
8,755,837 B2 6/2014 Rhoads et al.
(Continued)

FOREIGN PATENT DOCUMENTS

CN 104573688 A 4/2015
CN 104778702 A 7/2015
(Continued)

OTHER PUBLICATIONS

Pham, T. D., Park, C., Nguyen, D. T., Batchuluun, G., & Park, K. R. (2020). Deep learning-based fake-banknote detection for the visually impaired people using visible-light images captured by smartphone cameras. IEEE Access, 8, 63144-63161. (Year: 2020).*

(Continued)

*Primary Examiner* — Molly Wilburn
*Assistant Examiner* — Aidan Keup
(74) *Attorney, Agent, or Firm* — Matthew J. Spegele

(57) ABSTRACT

AI based steganographic systems and methods are described for analyzing pixel data of a product to detect product counterfeiting. An AI based imaging model is trained with pixel data of a plurality of training images comprising (1) a first subset of images each depicting at least a portion of the product having one or more authentic steganographic features, and (2) a second subset of images each depicting at least a portion of the product devoid of the one or more authentic steganographic features. A new image comprising pixel data of the product may be received and analyzed by the AI based imaging model to detect the pixel-based feature presence or absence of authentic steganographic feature(s) to determine an image classification of the product. The AI based steganographic systems and methods may detect whether the product is authentic or counterfeit based on the image classification.

22 Claims, 12 Drawing Sheets

(51) Int. Cl.
*G06F 18/214* (2023.01)
*G06F 18/2431* (2023.01)
*G06K 7/14* (2006.01)
*G06V 10/44* (2022.01)
*G06V 10/82* (2022.01)
*G06V 20/00* (2022.01)

(52) U.S. Cl.
CPC ....... *G06F 18/2431* (2023.01); *G06K 7/1413* (2013.01); *G06K 7/1417* (2013.01); *G06V 10/44* (2022.01); *G06V 10/82* (2022.01)

(56) References Cited

U.S. PATENT DOCUMENTS

| | | |
|---|---|---|
| 8,893,974 B2 | 11/2014 | Pawlik et al. |
| 9,443,179 B2 | 9/2016 | Meadows |
| 9,846,814 B1 | 12/2017 | Fraser |
| 11,074,592 B2 | 7/2021 | Stonehouse et al. |
| 2011/0280480 A1 | 11/2011 | Simske et al. |
| 2014/0037196 A1 | 2/2014 | Blair |
| 2016/0110630 A1 | 4/2016 | Heusch et al. |
| 2016/0169818 A1 | 6/2016 | Martin |
| 2016/0283975 A1 | 9/2016 | Kaul |
| 2017/0032285 A1 | 2/2017 | Sharma |
| 2017/0161745 A1 | 6/2017 | Hawkins |
| 2017/0193525 A1 | 7/2017 | Shah et al. |
| 2017/0316477 A1 | 11/2017 | Prasad |
| 2018/0068429 A1 | 3/2018 | Tan et al. |
| 2018/0108101 A1* | 4/2018 | Rodriguez ........... G06K 7/1417 |
| 2018/0247194 A1 | 8/2018 | Plebani et al. |
| 2019/0126659 A1* | 5/2019 | Dorier .................... B41M 3/144 |
| 2019/0138775 A1 | 5/2019 | Graindourze |
| 2019/0197358 A1 | 6/2019 | Madani et al. |
| 2019/0213462 A1 | 7/2019 | Mcdonald et al. |
| 2019/0213604 A1 | 7/2019 | Meadows et al. |
| 2019/0236614 A1* | 8/2019 | Burgin ................. G06V 10/764 |
| 2019/0293564 A1 | 9/2019 | Mehrotra et al. |
| 2019/0392458 A1 | 12/2019 | Stonehouse |
| 2020/0005237 A1 | 1/2020 | Simons |
| 2020/0231109 A1* | 7/2020 | Baltaxe .................... G06N 3/08 |
| 2020/0410510 A1 | 12/2020 | Lau et al. |
| 2021/0074109 A1* | 3/2021 | Depta .................... G07D 7/205 |
| 2021/0086030 A1 | 3/2021 | Kashyap |
| 2021/0192340 A1 | 6/2021 | Stonehouse et al. |
| 2021/0374476 A1 | 12/2021 | Heikel |
| 2022/0051040 A1* | 2/2022 | Pegurri .................... G06N 3/08 |
| 2023/0222775 A1 | 7/2023 | Stonehouse |

FOREIGN PATENT DOCUMENTS

| | | |
|---|---|---|
| CN | 106469336 A | 3/2017 |
| CN | 106530200 A | 3/2017 |
| CN | 107563774 A | 1/2018 |
| CN | 109934761 A | 6/2019 |
| CN | 110222728 A | 9/2019 |
| CN | 110766423 A | 2/2020 |
| CN | 112001630 A | 11/2020 |
| GB | 2591178 A | 7/2021 |
| JP | 2017041161 A | 2/2017 |
| WO | 2010085257 A1 | 7/2010 |
| WO | 2012109294 A1 | 8/2012 |
| WO | 2013145224 A1 | 10/2013 |
| WO | 2015157526 A1 | 10/2015 |
| WO | 2016157172 A2 | 10/2016 |
| WO | 2018169657 A1 | 9/2018 |
| WO | 2021105514 A1 | 6/2021 |

OTHER PUBLICATIONS

All Office Actions; U.S. Appl. No. 16/953,387, filed Jul. 7, 2021.
All Office Actions; U.S. Appl. No. 18/095,150, filed Jan. 10, 2023.
G. Ford, "4 human-caused biases we need to fix formachine learning" Oct. 27, 2018. Available from https :!!thenextweb.comlnews!4-human-caused-biases-machine-learning, [accessed May 7, 2021].See section 3—Measurement bias.
S. Ghoneim, "5 Types of bias and how to eliminate them in your machine learning project" Apr. 16, 2019. Available from https :!!towardsdatascience. coml5 -types-of-bias-how-to-eliminate-themin-your-machine-learning-project-75 95 9af9d3 aO [accessed May 7, 2021]. See section 5—Measurement bias.
Swooptalent, "Machine learning bias", 2018. Available fromhttps :!!www. swooptalent. comlhubfs!Machine%2oLearning%2OBias%20Overview%20-%2oKevin%2Oat%2oSwoopTalent.pdf?ga=2.194658286.295599295.155732995 1-129422730.1537454063 [Accessed May 7, 2021].See slide 9.
T. Merritt, "Top 5 ways humans bias machinelearning", Jan. 9, 2019. Available from https :!!www.techrepublic.comlarticle!top-5 -ways-humans-bias-machine-learning! [accessed May 7, 2021]. See section 4—Measurement bias.

* cited by examiner

ARTIFICIAL INTELLIGENCE BASED STEGANOGRAPHIC SYSTEMS AND METHODS FOR ANALYZING PIXEL DATA OF A PRODUCT TO DETECT PRODUCT COUNTERFEITING

FIELD

The present disclosure generally relates to artificial intelligence (AI) based steganographic systems and methods, and more particularly to, AI based steganographic systems and methods for analyzing pixel data of a product to detect product counterfeiting.

BACKGROUND

Counterfeit items are a large problem in many industries, particularly in developing countries. They can erode consumer confidence or in extreme cases, cause actual, physical harm, and/or generate losses for manufacturers and distributors. A variety of methods have been used over the years to allow the verification of the authenticity of items, including holographic labels, RFID tags, and overt and covert codes. Although these methods may provide a way to detect counterfeit items, they also involve additional costs and/or complexity to the production or otherwise manufacturing process.

A variety of techniques have recently been proposed that involve manipulation of existing codes and/or information provided on a product for tracking purposes. For example, WO 2012/109294 A1 discloses a method of printing a product code with one or more modified characters. The method uses an existing alphanumeric code that is determined by, for example, the date and location of manufacture, and existing printing technology. An algorithm is applied to digits in the original code (pre-modification), and based on the output of the algorithm, one or more digits in the code are selected and modified in a predetermined manner. For example, the modification may involve removal of a pixel of an individual digit that is barely perceptible to the naked eye, but that provides a clear signal to someone actively seeking to verify the authenticity of the product.

While such techniques are considerably useful in terms of helping manufacturers, retailers, and end users to ascertain the authenticity of products, counterfeiters are becoming more sophisticated at interpreting such codes and being able to replicate them. This problem becomes exacerbated for manufacturers or otherwise entities using imaging analysis to detect counterfeit items or products. This is because the ever increasing numbers of counterfeit items, each of which may have various shapes, sizes, and graphics—and, each of which may employ various techniques to mimic authentic products—can be vastly different in their configuration and/or appearance, even if such differences may be subtle in visual appearance. Such vast numbers of different counterfeit products and images create difficulties in building robust image based systems to combat product counterfeiting, at least because it is difficult for a manufacturer or entity to readily identify, gather, or otherwise access the various numbers and different types of counterfeit images of counterfeit products as created by different counterfeiters for building and developing robust and/or accurate systems. For example, US 2019/0392458 A1, entitled "Method of Determining Authenticity of a Consumer Good," describes a method of classifying a consumer good as authentic, where the method leverages machine learning and the use of steganographic features on a given authentic consumer good. While the method may be used to identify steganographic features on authentic consumer good(s) for the purpose of authentication consumer goods, the method, and its underlying machine learning model, is limited because it relies on vast numbers of real-world images of non-authentic consumer goods, which can be prohibitively costly or time consuming to obtain, organize, structure, or otherwise aggregate. For the same reasons, data pre-processing and/or training of a robust machine-learning model with such real-world images of non-authentic consumer goods can cause errors and delays, or other issues in preparing or supervising the training dataset that would otherwise be required for generation of a robust machine learning model. This can include because such vast numbers of real-world images of non-authentic consumer goods may have different, unknown, and/or underrepresented depictions of non-authentic features, which would cause significant manual processing and/or manipulation to prepare a training dataset for generation of a robust machine learning model.

For the foregoing reasons, there is a need for AI based steganographic systems and methods for analyzing pixel data of a product to detect product counterfeiting, where such AI based steganographic systems and methods do not depend on vast numbers of real-world images of non-authentic consumer goods.

SUMMARY

Generally, as described herein, AI based steganographic systems and methods are disclosed for detecting product counterfeiting. Such AI based steganographic systems provide a digital imaging, and artificial intelligence, based solution for overcoming problems that arise from the difficulties in identifying, accessing, or gathering the large numbers and/or different types of counterfeit images needed to train a robust AI model for detecting whether a given product, as determined from pixel data of a newly provided image, is authentic or counterfeit.

The AI based steganographic systems and methods generally comprise training AI based model(s) (e.g., neural network based models) to recognize authentic or genuine products, e.g., based on authentic or genuine batch codes, artwork, labels, or the like of a product appearing in an image of the product. Typically, for an AI based solution, it is necessary to input many examples (high hundreds or thousands) of images of both authentic and counterfeit products into a training set to train the AI model. This can include images of different products in different markets, each of which may have different artwork, batch codes, labels, etc. However, finding and inputting real-world examples of each (and in sufficient numbers) of such training images is rate limiting especially outside of markets where such images cannot easily be identified or accessed, but where there still include many hundreds of counterfeit products.

Accordingly, the disclosure herein provides solutions that allow for development of a robust, enhanced, and accurate system without the need to identify and/or access examples of images of real-world counterfeit products. This solution may be applied to all, or at least most, products, geographic locations, and/or countries without the burden or need of hundreds of counterfeit products, and related product images, from each market. The disclosure herein provides inventive features comprising the training of an AI model to detect whether deliberately added authenticating features (e.g., as added packaging and/or printed codes) are present or not within an image of a product. This can include whether certain authenticating barcode features are present or absent within the image of a product. For example, in an aspect involving barcodes, training an AI based imaging model may require inputting, into an AI training algorithm, thousands of images of barcodes, with and without the added security features, which may include authenticating features as described herein. The barcodes used to train the AI model may comprise barcodes lacking or devoid of the authenticating features. In some aspects, such images may comprise synthesized (or generated) examples of counterfeit images, where such synthesized examples include modified versions of authentic images, where, for example, authenticating features within the image are deleted, modified, or otherwise altered. Using such synthesized images allow the AI model to be generated quickly, without the need for vast numbers of images of real-world counterfeits, while allowing a robust feature detection model. In addition, the present disclosure has broad scope, essentially directed to synthesizing, testing, and using examples of any steganographic feature (e.g., within an image) for purposes of generating, training, and/or building robust AI models and related systems and methods.

The AI based steganographic systems as described herein allow a user to submit a new image to an imaging server(s) (e.g., including its one or more processors), or otherwise a computing device (e.g., such as locally on the user's mobile device), where the imaging server(s) or user computing device, implements or executes an artificial intelligence based AI based imaging model trained with pixel data of potentially 10,000 (or more) images depicting products with or without (devoid of) one or more authentic steganographic features. The AI based imaging model may generate, based on an image classification of image classification of the product, an image classification of the product. For example, at least one portion of an image of product can comprise pixels or pixel data may indicate a pixel-based feature presence or absence of the one or more authentic steganographic features. In some aspects, the image classification, or related indication of authentication or counterfeiting, may be transmitted via a computer network to a user computing device of the user for rendering on a display screen. In other aspects, no transmission to the imaging server of the user's specific image occurs, where the classification, or related indication of authentication or counterfeiting may instead be generated by the AI based imaging model, executing and/or implemented locally on the user's mobile device and rendered, by a processor of the mobile device, on a display screen of the mobile device. In various aspects, such rendering may include graphical representations, overlays, annotations, and the like for addressing the feature in the pixel data.

More specifically, as described herein, an AI based steganographic system is disclosed. The AI based steganographic system is configured to analyze pixel data of a product to detect product counterfeiting. In various aspects, the AI based steganographic system comprises one or more processors and a steganographic application (app) comprising computing instructions configured to execute on the one or more processors. The AI based steganographic system further comprises an AI based imaging model, accessible by steganographic app, and trained with pixel data of a plurality of training images. The plurality of training images may comprise (1) a first subset of images each depicting at least a portion of the product having one or more authentic steganographic features, and (2) a second subset of images each depicting at least a portion of the product devoid of the one or more authentic steganographic features. In various aspects, the AI based imaging model may be configured to output one or more image classifications corresponding to a pixel-based feature presence or absence of the one or more authentic steganographic features. In addition, the computing instructions of the steganographic app, when executed by the one or more processors, may be configured to cause the one or more processors to: (a) receive a new image of the product, the new image comprising a digital image as captured by a digital camera, and the new image comprising pixel data of at least a portion of the product; (b) analyze, by the AI based imaging model, the pixel data of the new image for the pixel-based feature presence or absence of the one or more authentic steganographic features to determine an image classification of the product, where the image classification is selected from the one or more image classifications of the AI based imaging model; and (c) detect whether the product is authentic or counterfeit based on the image classification.

In addition, as described herein, an AI based steganographic method is disclosed for analyzing pixel data of a product to detect product counterfeiting. The AI based steganographic method comprises training, by one or more processors of a computing device, an AI based imaging model with pixel data of a plurality of training images. The plurality of training images may comprise (1) a first subset of images each depicting at least a portion of the product having one or more authentic steganographic features, and (2) a second subset of images each depicting at least a portion of the product devoid of the one or more authentic steganographic features. The AI based imaging model may be configured to output one or more image classifications corresponding to a pixel-based feature presence or absence of the one or more authentic steganographic features. The AI based steganographic method may further comprise receiving, by the one or more processors, a new image of the product, the new image comprising a digital image as captured by a digital camera, and the new image comprising pixel data of at least a portion of the product. The AI based steganographic method may further comprise analyzing, by the AI based imaging model, the pixel data of the new image for the pixel-based feature presence or absence of the one or more authentic steganographic features to determine an image classification of the product, where the image classification is selected from the one or more image classifications of the AI based imaging model. The AI based steganographic method may further comprise detecting, by the one or more processors, whether the product is authentic or counterfeit based on the image classification.

Further, as described herein, a tangible, non-transitory computer-readable medium storing instructions for analyzing pixel data of a product to detect product counterfeiting is disclosed. The instructions, when executed by one or more processors of a computing device, may cause the one or more processors of the computing device to train, by one or more processors of a computing device, an AI based imaging model with pixel data of a plurality of training images. In various aspects, the plurality of training images may comprise (1) a first subset of images each depicting at least a portion of the product having one or more authentic steganographic features, and (2) a second subset of images each depicting at least a portion of the product devoid of the one or more authentic steganographic features. The AI based imaging model may be configured to output one or more image classifications corresponding to a pixel-based feature presence or absence of the one or more authentic steganographic features. The instructions, when executed by one or more processors of a computing device, may cause the one or more processors of the computing device to receive, by the one or more processors, a new image of the product. The new image may comprise a digital image as captured by a digital camera and the new image may comprise pixel data of at least a portion of the product. In addition, the instructions, when executed by one or more processors of a computing device, may cause the one or more processors of the computing device to analyze, by the AI based imaging model, the pixel data of the new image for the pixel-based feature presence or absence of the one or more authentic steganographic features to determine an image classification of the product. The image classification may be selected from the one or more image classifications of the AI based imaging model. Still further, the instructions, when executed by one or more processors of a computing device, may cause the one or more processors of the computing device to detect, by the one or more processors, whether the product is authentic or counterfeit based on the image classification.

In accordance with the above, and with the disclosure herein, the present disclosure includes improvements in computer functionality or in improvements to other technologies at least because the disclosure describes that, e.g., an imaging server, or otherwise computing device (e.g., a user computer device), is improved where the intelligence or predictive ability of the imaging server or computing device is enhanced by a trained (e.g., machine learning trained) AI based imaging model. The AI based imaging model, executing on the imaging server or computing device, is able to more accurately detect, based on pixel data of real-world or synthesized images of products, pixel-based feature presence or absence of the one or more authentic steganographic features to determine an image classification of the product and detect whether the product is authentic or counterfeit based on the image classification. That is, the present disclosure describes improvements in the functioning of the computer itself or "any other technology or technical field" because an imaging server or user computing device is enhanced with a plurality of training images (e.g., 10,000 s of training images and related pixel data as feature data) to accurately predict, detect, or determine pixel data of product images, such as newly provided product images. This improves, in the field of steganography, over the prior art at least because existing systems lack such predictive or classification functionality and are simply not capable of accurately analyzing, with a trained model, real-world and synthesized images to output a predictive result to address at least one feature identifiable within the pixel data comprising image classifications for detecting whether the product is authentic or counterfeit based on the image classification.

For similar reasons, the present disclosure relates to improvement to other technologies or technical fields at least because the trained AI based imaging model executing on the imaging servers(s) or computing devices improve the field of steganography and/or anti-counterfeiting, by providing a robust AI based imaging model that may be trained with synthesized images allowing for precise training (identifying specific features to train) and without the need for vast number of real-world images of counterfeit products, allowing for rapid training of accurate AI models and digital and/or artificial intelligence based analysis of synthesized (and real-world) images of products for outputting a predictive result and/or classification to detect whether the product is authentic or counterfeit based on the image classification.

In addition, the present disclosure relates to improvement to other technologies or technical fields at least because the present disclosure describes or introduces improvements to computing devices in printers or, more generally in the field of steganographic printing, whereby the trained AI based imaging model executing on the imaging device(s) or computing devices is communicatively coupled to a printer and improves the underlying computer device (e.g., imaging server(s) and/or user computing device), where such computer devices are made more efficient by the configuration, adjustment, or adaptation of a given machine-learning network architecture to provide unique printed codes or values on physical products. For example, in some aspects, fewer machine resources (e.g., processing cycles or memory storage) may be used by decreasing computational resources by decreasing machine-learning network architecture needed to analyze images, including by reducing depth, width, image size, or other machine-learning based dimensionality requirements. Such reduction frees up the computational resources of an underlying computing system, thereby making it more efficient.

In addition, the present disclosure includes applying certain of the claim elements with, or by use of, a particular machine, e.g., a printer, including continuous ink jet, thermal ink jet, drop on demand, thermal transfer printers, or laser ablation or other laser marking devices, hot-melt wax printers, for printing anti-counterfeit codes or otherwise features on one or more products or substrates thereof, where such printed codes or otherwise features may then be captured in digital images for the use with an AI based imaging model for classifying the image to detect whether the product is authentic or counterfeit based on the image classification.

In addition, the present disclosure includes specific features other than what is well-understood, routine, conventional activity in the field, or adds unconventional steps that confine the claim to a particular useful application, e.g., analyzing pixel data of a product to detect product counterfeiting.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
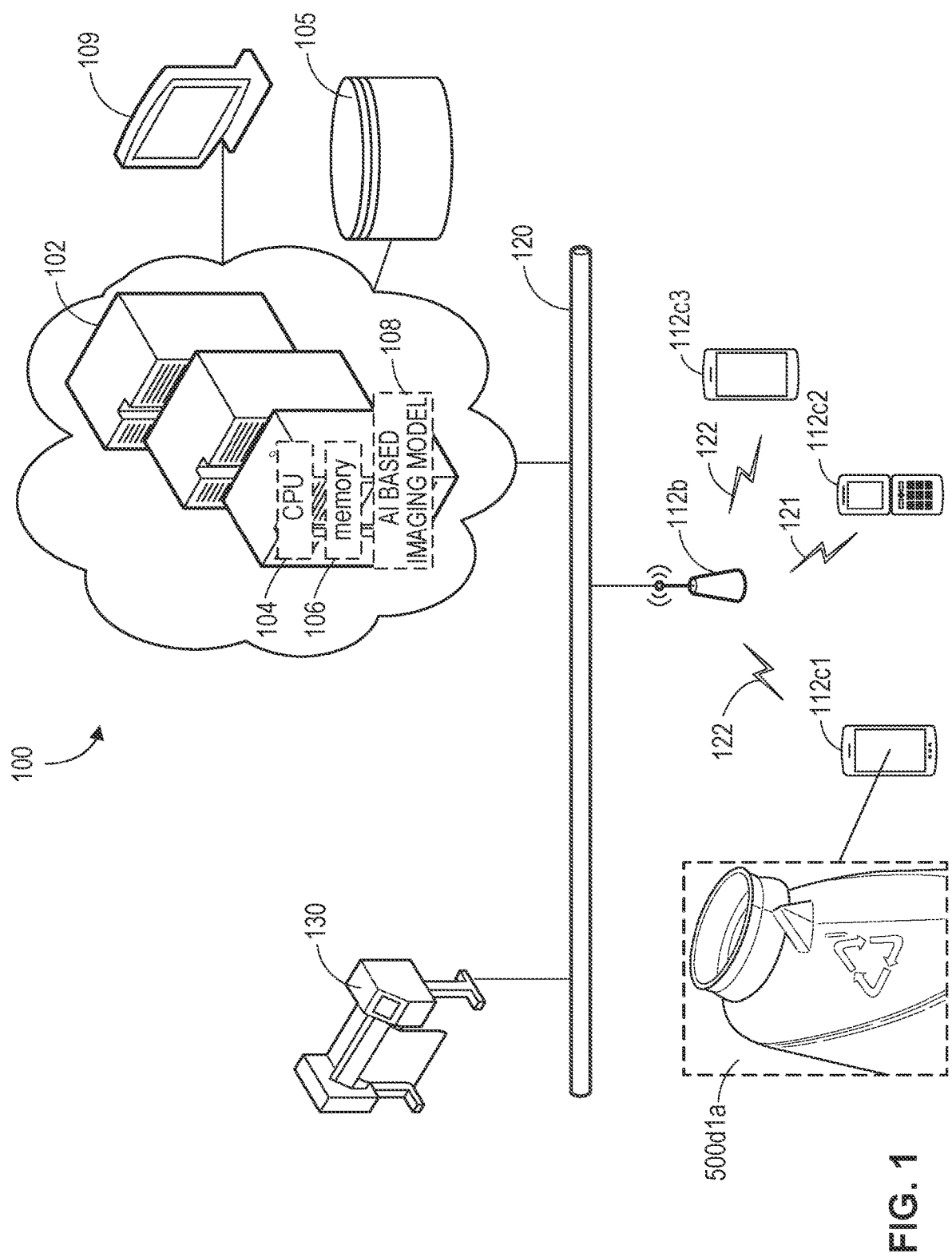
FIG. 1 illustrates an example artificial intelligence (AI) based steganographic system configured to analyze pixel data of a product to detect product counterfeiting, in accordance with various aspects disclosed herein.

FIG. 1 illustrates an example artificial intelligence (AI) based steganographic system 100 configured to analyze pixel data of image(s) (e.g., of any one or more of the images depicted for FIGS. 5A to 5G) of a product to detect product counterfeiting, in accordance with various aspects disclosed herein. In the example aspect of FIG. 1, AI based steganographic system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, imaging server(s) 102 may be any one or more cloud-based platform(s) such as MICROSOFT AZURE, AMAZON AWS, or the like. Server(s) 102 may include one or more processor(s) 104 as well as one or more computer memory 106. In various aspects, server(s) 102 may be referred to herein as "imaging server(s)."

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store a AI based imaging model 108, which may be an artificial intelligence based model, such as a machine learning model, neural network model, convolutional neural network (CNN) model, or the like, trained on various images (e.g., images or image sets 500a to 500f of FIGS. 5A to 5G), as described herein. As described herein, AI based imaging model 108, is accessible by a steganographic app, and trained with pixel data of a plurality of training images comprising (1) a first subset of images (e.g., any one or more of images 501a1, 500ba1-500ba7, 500c1a-500c2a, 500d1a, 500e1a1-500e1a2, 500f1-500f2, and/or 500gc as described for FIGS. 5A to 5G) each depicting at least a portion of the product having one or more authentic steganographic features, and (2) a second subset of images (e.g., any one or more of images 500bn, 500c1n-500c2n, 500d1n, 500e1n, and/or 500gr as described for FIGS. 5A to 5G) each depicting at least a portion of the product devoid of the one or more authentic steganographic features. In addition, AI based imaging model 108 is configured to output one or more image classifications corresponding to a pixel-based feature presence or absence of the one or more authentic steganographic features.

AI based imaging model 108 may also be stored in database 105, which is accessible or otherwise communicatively coupled to imaging server(s) 102. In addition, memory 106 may also store machine readable instructions, including any of one or more application(s) (e.g., an steganographic application (app) as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging based machine learning model or component, such as the AI based imaging model 108, where each may be configured to facilitate their various functionalities discussed herein. It should be appreciated that one or more other applications are envisioned, such as steganographic app, and that are executed by the processor(s) 104.

The processor(s) 104 may be connected to the memory 106 via a computer bus responsible for transmitting electronic data, data packets, or otherwise electronic signals to and from the processor(s) 104 and memory 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memory 106 and/or the database 104 (e.g., a relational database, such as Oracle, DB2, MySQL, or a NoSQL based database, such as MongoDB). The data stored in memory 106 and/or database 105 may include all or part of any of the data or information described herein, including, for example, training images and/or new images (e.g., including any one or more of images or image sets 500a to 500f as described for FIGS. 5A to 5G herein), or other images and/or information of the user, including alphanumeric codes, artwork, batch codes, product labels, graphics, logos, or the like, or as otherwise described herein.

Imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memory(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to terminal 109. According to some aspects, an administrator or operator may access the server 102 via terminal 109 to review information, make changes, input training data or images, initiate training of AI based imaging model 108, and/or perform other functions.

As described herein, in some aspects, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memory 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, imaging server(s) 102 are communicatively connected, via computer network 120 to the one or more user computing devices 112c1-112c3 via base station 112b. In some aspects, base station 112b may comprise a cellular base station, such as cell tower(s), communicating to the one or more user computing devices 112c1-112c3 via wireless communications 121 based on any one or more of various mobile phone standards, including NMT, GSM, CDMA, UMMTS, LTE, 5G, or the like. Additionally or alternatively, a base station 112b may one or more comprise routers, wireless switches, or other such wireless connection points communicating to the one or more user computing devices 112c1-112c3 via wireless communications 122 based on any one or more of various wireless standards, including by non-limiting example, IEEE 802.11a/b/c/g (WIFI), the BLUETOOTH standard, or the like.

Any of the one or more user computing devices 112c1-112c3 may comprise mobile devices and/or client devices for accessing and/or communicating with imaging server(s) 102. Such mobile devices may comprise one or more mobile processor(s) and/or a digital camera for capturing images, such as images as described herein (e.g., any one or more of images or image sets 500a to 500f as described for FIGS. 5A to 5G herein). In various aspects, user computing devices 112c1-112c3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

In additional aspects, user computing devices 112c1-112c3 may comprise a retail computing device. A retail computing device may comprise a user computer device configured in a same or similar manner as a mobile device, e.g., as described herein for user computing devices 112c1-112c3, including having a processor and memory, for implementing, or communicating with (e.g., via server(s) 102), as described herein. Additionally, or alternatively, a retail computing device may be located, installed, or otherwise positioned within a retail environment to allow users and/or customers of the retail environment to utilize the AI based steganographic systems and methods on site within the retail environment. For example, the retail computing device may be installed within a kiosk for access by a user. The user may then upload or transfer images (e.g., from a user mobile device) to the kiosk to implement the AI based steganographic systems and methods described herein. Additionally, or alternatively, the kiosk may be configured with a camera to allow the user to take new images to detect counterfeit product(s) and/or for upload and transfer to server(s) 102. In such aspects, the user would be able to use the retail computing device to receive and/or have rendered an indication of whether the product is authentic or counterfeit, as described herein, on a display screen of the retail computing device.

In various aspects, the one or more user computing devices 112c1-112c3 may implement or execute an operating system (OS) or mobile platform such as Apple's iOS and/or Google's Android operation system. Any of the one or more user computing devices 112c1-112c3 may comprise one or more processors and/or one or more memory for storing, implementing, or executing computing instructions or code, e.g., an application (app), as described in various aspects herein. As shown in FIG. 1, AI based imaging model 108 and/or an imaging application as described herein, or at least portions thereof, may also be stored locally on a memory of a user computing device (e.g., user computing device 112c1).

User computing devices 112c1-111c3 and/or 112c1-112c3 may comprise a wireless transceiver to receive and transmit wireless communications 121 and/or 122 to and from base station 112b. In various aspects, pixel based images (e.g., images or image sets 500a to 500f as described for FIGS. 5A to 5G herein) may be transmitted via computer network 120 to imaging server(s) 102 for training of model(s) (e.g., AI based imaging model 108) and/or imaging analysis as described herein.

In addition, the one or more user computing devices 112c1-112c3 may include a digital camera and/or digital video camera for capturing or taking digital images and/or frames (e.g., which can be any one or more of images or image sets 500a to 500f as described for FIGS. 5A to 5G herein, such as image 500d1a as shown in image 500d1a). Each digital image may comprise pixel data for training or implementing model(s), such as AI or machine learning models, as described herein. For example, a digital camera and/or digital video camera of, e.g., any of user computing devices 112c1-112c3, may be configured to take, capture, or otherwise generate digital images (e.g., pixel based images or image sets 500a to 500f as described for FIGS. 5A to 5G herein) and, at least in some aspects, may store such images in a memory of a respective user computing devices. Additionally, or alternatively, such digital images may also be transmitted to and/or stored on memory 106 and/or database 105 of server(s) 102.

Still further, each of the one or more user computer devices 112c1-111c3 and/or 112c1-112c3 may include a display screen for displaying graphics, images, text, product authentication or counterfeit information, data, pixels, features, and/or other such visualizations or information as described herein. In various aspects, graphics, images, text, product authentication or counterfeit information, data, pixels, features, and/or other such visualizations or information may be received from imaging server(s) 102 for display on the display screen of any one or more of user computer devices 112c1-112c3. Additionally, or alternatively, a user computer device may comprise, implement, have access to, render, or otherwise expose, at least in part, an interface or a graphic user interface (GUI) for displaying text and/or images on its display screen.

In some aspects, computing instructions and/or applications executing at the server (e.g., server(s) 102) and/or at a mobile device (e.g., mobile device 112c1) may be communicatively connected for analyzing pixel data of an images or image sets (e.g., images or image sets 500a to 500f as described for FIGS. 5A to 5G herein) for detecting whether the product is authentic or counterfeit based on the image classification, as described herein. For example, one or more processors (e.g., processor(s) 104) of server(s) 102 may be communicatively coupled to a mobile device via a computer network (e.g., computer network 120). In such aspects, an imaging app may comprise a server app portion configured to execute on the one or more processors of the server (e.g., server(s) 102) and a mobile app portion configured to execute on one or more processors of the mobile device (e.g., any of one or more user computing devices 112c1-112c3). In such aspects, the server app portion is configured to communicate with the mobile app portion. The server app portion or the mobile app portion may each be configured to implement, or partially implement, one or more of: (1) receiving a new image of the product, the new image comprising a digital image as captured by a digital camera, and the new image comprising pixel data of at least a portion of the product; (2) analyzing, by the AI based imaging model, the pixel data of the new image for the pixel-based feature presence or absence of the one or more authentic steganographic features to determine an image classification of the product, where the image classification may be selected from the one or more image classifications of the AI based imaging model; and/or (3) detecting whether the product is authentic or counterfeit based on the image classification.

FIG. 1 further comprises printer 130. In various aspects, printer 130 is connected via network 120 to server(s) 102 and may receive print submissions or commands to print product code(s), steganographic features, or other features on products or substrates of products. For example, printer 130 may comprise an online printer and may be configured for printing in various mediums or in different ways (e.g., continuous inkjet, laser, thermal transfer, embossed, etc.). In some aspects, printer 130 is a printer under the direction or control of the owner or operator of server(s) 102, where printer 130 is part of a same network. In other aspects, printer may be a printer under the direction or control of a third-party and may be connected to server(s) 102 via the Internet.

Printer 130 is controlled to print a product code on a substrate, including continuous ink jet, thermal ink jet, drop on demand, thermal transfer printers, or laser ablation or other laser marking devices, hot-melt wax printers. A further aspect could be the use of a digital artwork printer to print the code. The substrate may be any desired substrate, including porous and non-porous materials, primary and secondary packaging, and the products themselves, typically consumer products.

In various aspects, processor(s) 104 of sever(s) 102 are configured to execute instructions to select a set of one or more authentic steganographic features for printing on a different version of a product. The different version of the product may be an old or previous product where the artwork may have changed. Moreover, a same product may have different versions of different steganographic features in the artwork. In some aspects, a single SKU or alphanumeric code of a product may have different variations when it comes to artwork and steganographic features incorporated therein.

Processor(s) 104 of sever(s) 102 may be further configured to execute instructions to generate a print submission for printing or augmenting, by printer 130 on a substrate of the different version of the product, the set of the one or more authentic steganographic features. The print submission may be sent by server(s) 102 over network 120 to printer 130 for printing labels, batch codes, artwork (having the authentic steganographic features) on the product or substrate of the product.

Figure 2:
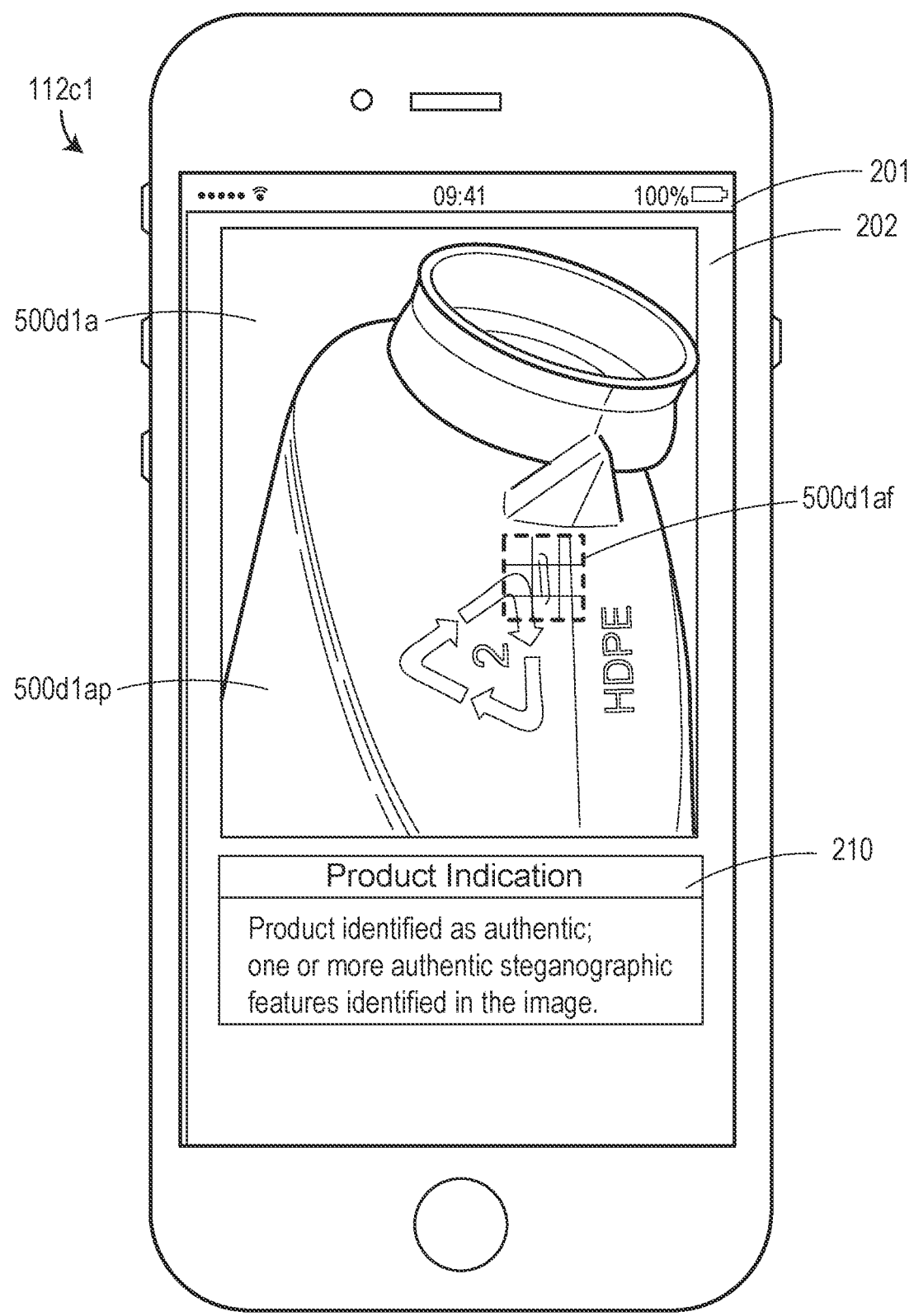
FIG. 2 illustrates an example user interface as rendered on a display screen of an example computing device of FIG. 1 in accordance with various aspects disclosed herein.

FIG. 2 illustrates an example user interface 202 as rendered on a display screen 201 of an example computing device (e.g., user computing device 112c1) of FIG. 1 in accordance with various aspects disclosed herein. For example, as shown in the example of FIG. 2, user interface 202 may be implemented or rendered via an application (app) executing on user computing device 112c1. For example, as shown in the example of FIG. 2, user interface 202 may be implemented or rendered via a native app executing on user computing device 112c1. In the example of FIG. 2, user computing device 112c1 is a user computer device as described for FIG. 1, e.g., where 112c1 is illustrated as an APPLE iPhone that implements the APPLE iOS operating system and that has display screen 201. User computing device 112c1 may execute one or more native applications (apps) on its operating system, including, for example, imaging app as described herein. Such native apps may be implemented or coded (e.g., as computing instructions) in a computing language (e.g., SWIFT) executable by the user computing device operating system (e.g., APPLE iOS) by the processor of user computing device 112c1.

Additionally, or alternatively, user interface 202 may be implemented or rendered via a web interface, such as via a web browser application, e.g., Safari and/or Google Chrome app(s), or other such web browser or the like.

As shown in the example of FIG. 2, user interface 202 comprises an image, e.g., image 500d1a of product 500d1ap. In the aspect of FIG. 2, image 500d1a comprises a new image, e.g., as digital image as captured by a digital camera of user computing device 112c1, where the new image (e.g., of image 500d1a) comprises pixel data (e.g., pixel data corresponding to feature 500d1af) of at least a portion of the product (e.g., 500d1ap) as described herein. In the example of FIG. 2, image 500d1a of the product (e.g., product 500d1ap) includes one or more steganographic features (e.g., feature 500d1af) corresponding to one or more authentic steganographic features. For example, the area of image 500d1a includes pixel data comprising feature 500d1af. Feature 500d1af depicts an authentic steganographic feature in the form of a raised or embossed element printed on a surface of substrate of product 500d1ap.

In some aspects, an AI based imaging model (e.g., AI based imaging model 108) may be trained with an image 500d1a to identify the authentic steganographic feature, e.g., feature 500d1af.

In other aspects, once trained, AI based imaging model (e.g., AI based imaging model 108) may be used to (1) receive a new image of the product (e.g., of image 500d1a) comprising pixel data (e.g., pixel data of feature 500d1af) of at least a portion of the product; (2) analyze, by the AI based imaging model (e.g., AI based imaging model 108), the pixel data of the new image for the pixel-based feature presence or absence of the one or more authentic steganographic features to determine an image classification of the product, the image classification selected from the one or more image classifications of the AI based imaging model, and (3) detect whether the product is authentic or counterfeit based on the image classification.

For example, in some aspects, computing instructions of a steganographic app, when executed by the one or more processors of a computing device (e.g., user computing device 112c1), are configured to cause the one or more processors to render, on a display screen (e.g., display screen 201) of the computing device, an indication (e.g., indication 210) of whether the product is authentic or counterfeit.

Additionally, or alternatively, in some aspects, computing instructions of a steganographic app, when executed by the one or more processors of a computing device (e.g., user computing device 112c1), are configured to cause the one or more processors to render, on a display screen (e.g., display screen 201) of the computing device, a visual or graphic indication of a pixel-based feature presence or absence of the one or more authentic steganographic features within the new image of the product. For example, in the example of FIG. 2, feature 500d1af may be visually or graphically annotated with highlighting, colors, zooming, circling, etc. to indicate that feature 500d1af is present in image 500d1a. In other aspects, where no feature is present, a message or graphic (not shown) may be displayed or shown to indicate that no such feature is shown. Such message or graphic may indicate that the product is counterfeit because the feature (e.g., authentic steganographic feature) is missing or not found in the image.

In various aspects, a new image (e.g., image 500d1a), e.g., with a visual or graphic indication of a pixel-based feature presence or absence of one or more authentic steganographic features (e.g., feature 500d1af) within the new image of the product (e.g., product 500d1ap) and/or an indication (e.g., indication 210) of whether the product is authentic or counterfeit may be transmitted, via the computer network (e.g., from an imaging server 102 and/or one or more processors) to user computing device 112c1, for rendering on display screen 201. In other aspects, no transmission to the imaging server of the user's specific image occurs, where the visual or graphic indication of a pixel-based feature presence or absence of one or more authentic steganographic features (e.g., feature 500d1af) within the new image of the product (e.g., product 500d1ap) and/or an indication (e.g., indication 210) of whether the product is authentic or counterfeit may instead be generated locally, by the AI based imaging model (e.g., AI based imaging model 108) executing and/or implemented on the user's mobile device (e.g., user computing device 112c1) and rendered, by a processor of the mobile device, on display screen 201 of the mobile device (e.g., user computing device 112c1).

In some aspects, any one or more of a visual or graphic indication of a pixel-based feature presence or absence of one or more authentic steganographic features (e.g., feature 500d1af) within the new image of the product (e.g., product 500d1ap) and/or an indication (e.g., indication 210) of whether the product is authentic or counterfeit may be rendered (e.g., rendered locally on display screen 201) in real-time or near-real time during or after receiving or capturing, the new image (e.g., image 500d1a). In aspects where the new image is analyzed by imaging server(s) 102, the image may be transmitted and analyzed in real-time or near real-time by imaging server(s) 102.

In some aspects, a user may provide a new image that may be transmitted to imaging server(s) 102 for updating, retraining, or reanalyzing by AI based imaging model 108. In other aspects, a new image that may be locally received on computing device 112c1 and analyzed, by AI based imaging model 108, on the computing device 112c1.

In various aspects, the visual or graphic indication of a pixel-based feature presence or absence of one or more authentic steganographic features (e.g., feature 500d1af) within the new image of the product (e.g., product 500d1ap) and/or an indication (e.g., indication 210) of whether the product is authentic or counterfeit may be transmitted via the computer network, from server(s) 102, to the user computing device of the user for rendering on the display screen 201 of the user computing device (e.g., user computing device 112c1).

In other aspects, no transmission to the imaging server of the user's new image occurs, where the visual or graphic indication of a pixel-based feature presence or absence of one or more authentic steganographic features (e.g., feature 500d1af) within the new image of the product (e.g., product 500d1ap) and/or an indication (e.g., indication 210) of whether the product is authentic or counterfeit may instead be generated locally, by the AI based imaging model (e.g., AI based imaging model 108) executing and/or implemented on the user's mobile device (e.g., user computing device 112c1) and rendered, by a processor of the mobile device, on a display screen of the mobile device (e.g., user computing device 112c1).

Figure 3:
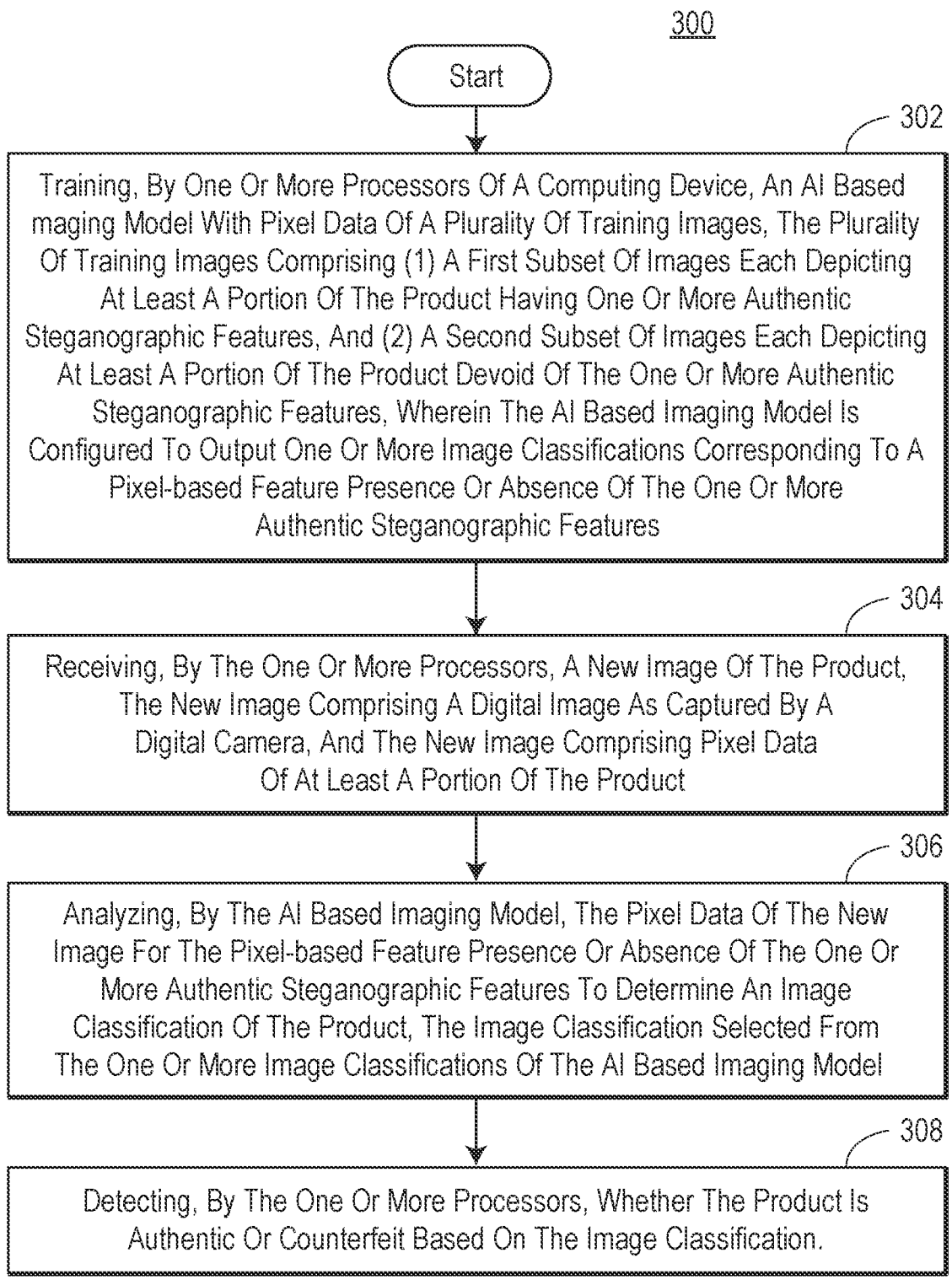
FIG. 3 illustrates an example artificial intelligence (AI) based steganographic method for analyzing pixel data of a product to detect product counterfeiting, in accordance with various aspects disclosed herein.

FIG. 3 illustrates an example artificial intelligence (AI) based steganographic method 300 for analyzing pixel data of a product to detect product counterfeiting, in accordance with various aspects disclosed herein. At block 302, AI based steganographic method 300 comprises training, by one or more processors of a computing device, an AI based imaging model (e.g., AI based imaging model 108) with pixel data of a plurality of training images. The AI based imaging model may implemented and/or trained as, or with, a Conventional Neural Network (CNN) model and/or decision tree based model as described herein for FIGS. 4A and 4B.

The AI based imaging model (e.g., based imaging model 108) is trained, or otherwise configured, to output one or more image classifications corresponding to a pixel-based feature presence or absence of the one or more authentic steganographic features.

In various aspects, AI based imaging model (e.g., AI based imaging model 108) is an artificial intelligence (AI) based model trained with at least one AI algorithm. Training of AI based imaging model 108 involves image analysis of the training images to configure weights of AI based imaging model 108, and its underlying algorithm (e.g., machine learning or artificial intelligence algorithm) used to predict and/or classify future images. For example, in various aspects herein, generation of AI based imaging model 108 involves training AI based imaging model 108 with the plurality of training images comprising (1) a first subset of images each depicting at least a portion of a product (e.g., product 500$d1ap$) having one or more authentic steganographic features (e.g., feature 500$d1af$ depicted within the pixel data of image 500$d1a$), and (2) a second subset of images each depicting at least a portion of the product (e.g., product 500$d1np$) devoid of the one or more authentic steganographic features. In some aspects, one or more processors of a server or a cloud-based computing platform (e.g., imaging server(s) 102) may receive the plurality of training images via a computer network (e.g., computer network 120). In such aspects, the server and/or the cloud-based computing platform may train the AI based imaging model with the pixel data of the plurality of training images.

In various aspects, a machine learning imaging model, as described herein (e.g. AI based imaging model 108), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning may involve identifying and recognizing patterns in existing data (such as authentic steganographic features (or the lack thereof) in the pixel data of image as described herein) in order to facilitate making predictions, classifications, and/or identifications for subsequent data (such as using the model on new pixel data of a new image in order to determine or generate a classification or prediction for, or associated with, detecting whether a product is authentic or counterfeit based on the image classification or prediction).

Machine learning model(s), such as the AI based imaging model described herein for some aspects, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

In various aspects, a AI based imaging model (e.g., AI based imaging model 108) may be trained, by one or more processors (e.g., one or more processor(s) 104 of server(s) 102 and/or processors of a computer user device, such as a mobile device) with the pixel data of a plurality of training images, e.g., (1) a first subset of images (e.g., any one or more of images 501$a1$, 500$ba1$-500$ba7$, 500$c1a$-500$c2a$, 500$d1a$, 500$e1a1$-500$e1a2$, 500$f1$-500$f2$, and/or 500$gc$ as described for FIGS. 5A to 5G) each depicting at least a portion of the product having one or more authentic steganographic features (e.g., features 500$af$, 500$ba1f$, 500$ba2f$, 500$ba3f$, 500$ba4f$, 500$ba5f$, 500$ba6f1$, 500$ba6f2$, 500$ba7f$, 500$c1af$, 500$c2af$, 500$d1af$, 500$ea1f$, 500$ea2f$, 500$fdm$, 500$fqr$, and/or 500$grf$), and (2) a second subset of images (e.g., any one or more of images 500$bn$, 500$c1n$-500$c2n$, 500$d1n$, 500$e1n$, and/or 500$gr$ as described for FIGS. 5A to 5G) each depicting at least a portion of the product devoid of the one or more authentic steganographic features. In various aspects, an AI based imaging model (e.g., training AI based imaging model 108) is configured output an image classification of the product.

In various aspects, training AI based imaging model 108 may be an ensemble model comprising multiple models or sub-models, comprising models trained by the same and/or different AI algorithms, as described herein, and that are configured to operate together. For example, in some aspects, each model be trained to identify or predict an image classification for a given image, where each model may output or determine a classification for an image such that a given image may be identified, assigned, determined, or classified with one or more image classifications.

AI based imaging model (e.g., based imaging model 108) is trained to determine whether a product is authentic or counterfeit based on image analysis of images of normal and/or altered images of the product and whether such images have (or do not have) some or all of the steganographic features within the given images. In various aspects, the plurality of training images may comprise (1) a first subset of images (e.g., any one or more of images 501a1, 500ba1-500ba7, 500c1a-500c2a, 500d1a, 500e1a1-500e1a2, 500f1-500f2, and/or 500gc as described for FIGS. 5A to 5G) each depicting at least a portion of the product having one or more authentic steganographic features (e.g., features 500af, 500ba1f, 500ba2f, 500ba3f, 500ba4f, 500ba5f, 500ba6f1, 500ba6f2, 500ba7f, 500c1af, 500c2af, 500d1af, 500ea1f, 500ea2f, 500fdm, 500fqr, and/or 500grf), and (2) a second subset of images (e.g., any one or more of images 500bn, 500c1n-500c2n, 500d1n, 500e1n, and/or 500gr as described for FIGS. 5A to 5G) each depicting at least a portion of the product devoid of the one or more authentic steganographic features.

Each image of the first subset of images and second subset of images comprise pixel data. Such pixel data may be used in various aspects, including, e.g., (1) training AI based imaging model 108; (2) analyzing, by the AI based imaging model, the pixel data of a new image for a pixel-based feature presence or absence of the one or more authentic steganographic features to determine an image classification of a product (e.g., product 500d1ap as depicted in image 500d1a as described herein for FIGS. 2 and 5D); and/or (3) detecting whether the product is authentic or counterfeit based on the image classification, as described herein for FIGS. 4A and 4B.

Figure 5A:
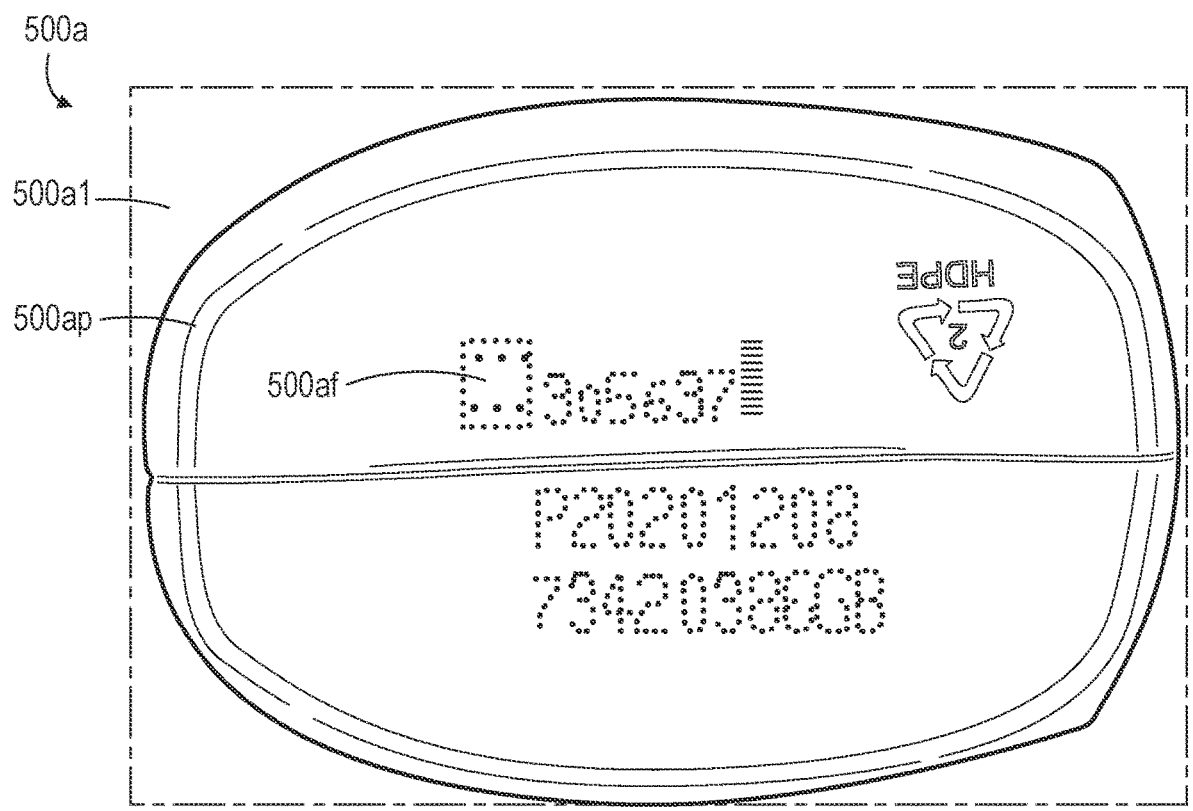
FIG. 5A illustrates an example image of printed symbol steganographic features in accordance with various aspects herein.
Figure 5B:
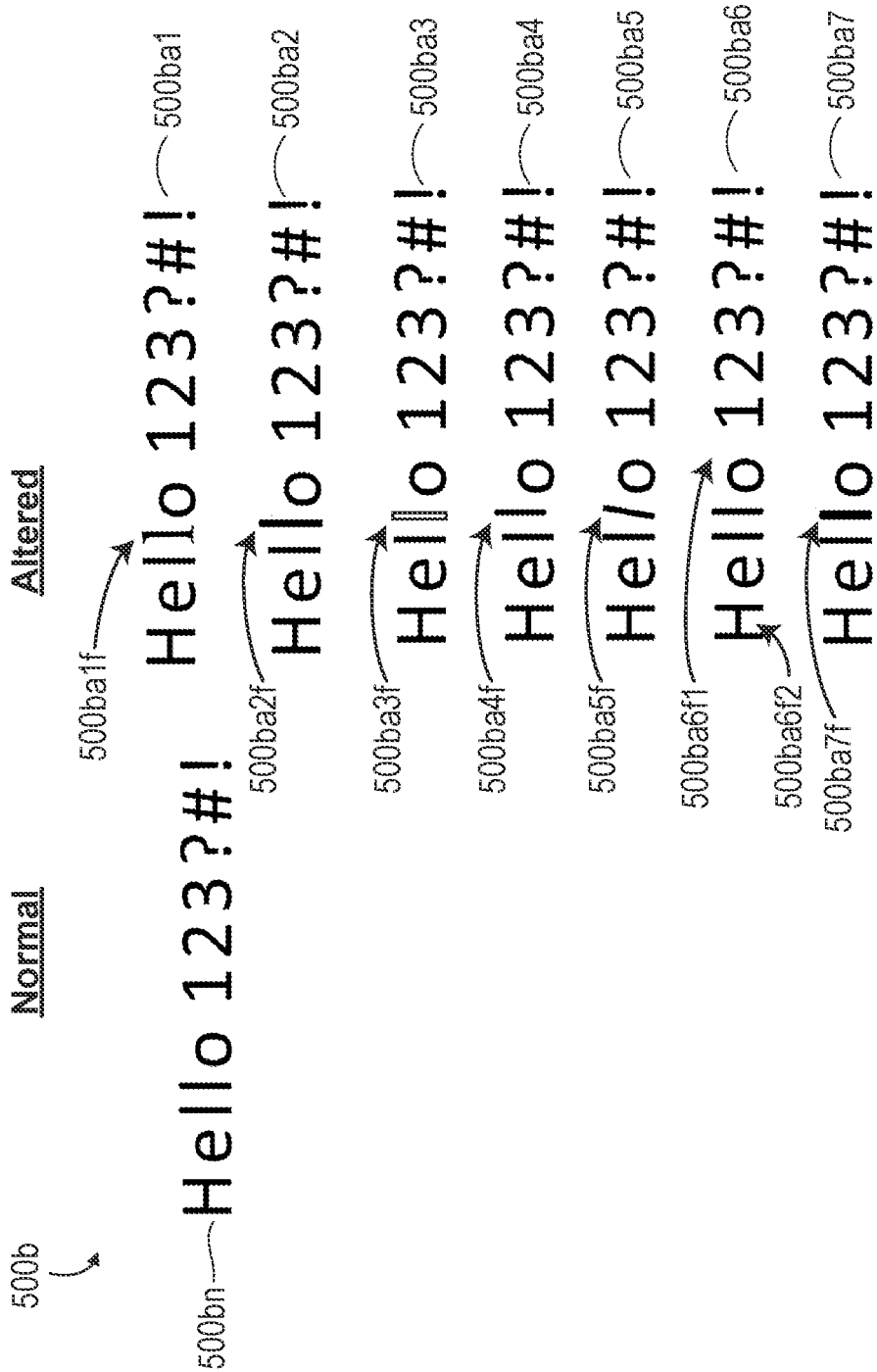
FIG. 5B illustrates example images of alphanumeric, textual characters, and font based steganographic features in accordance with various aspects herein.
Figure 5C:
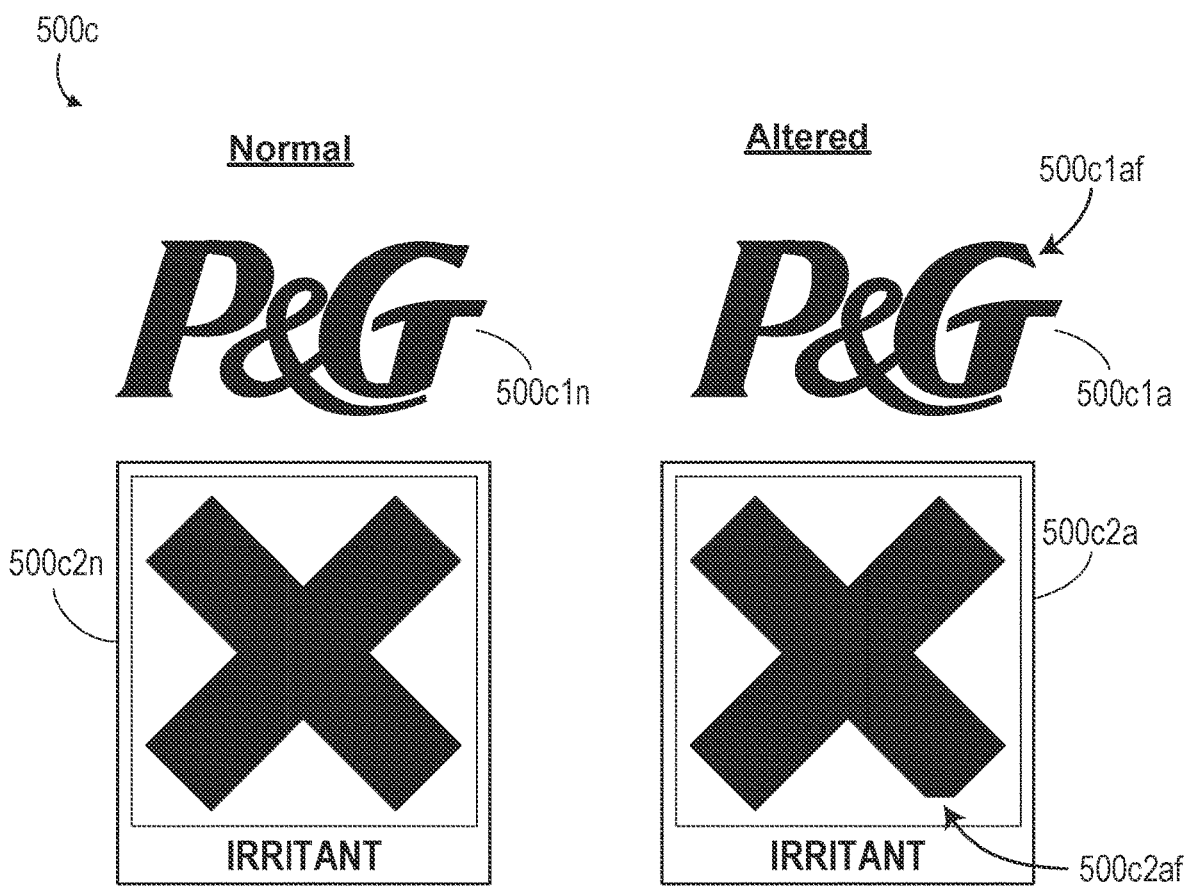
FIG. 5C illustrates example images of graphical alternation steganographic features in accordance with various aspects herein.
Figure 5D:
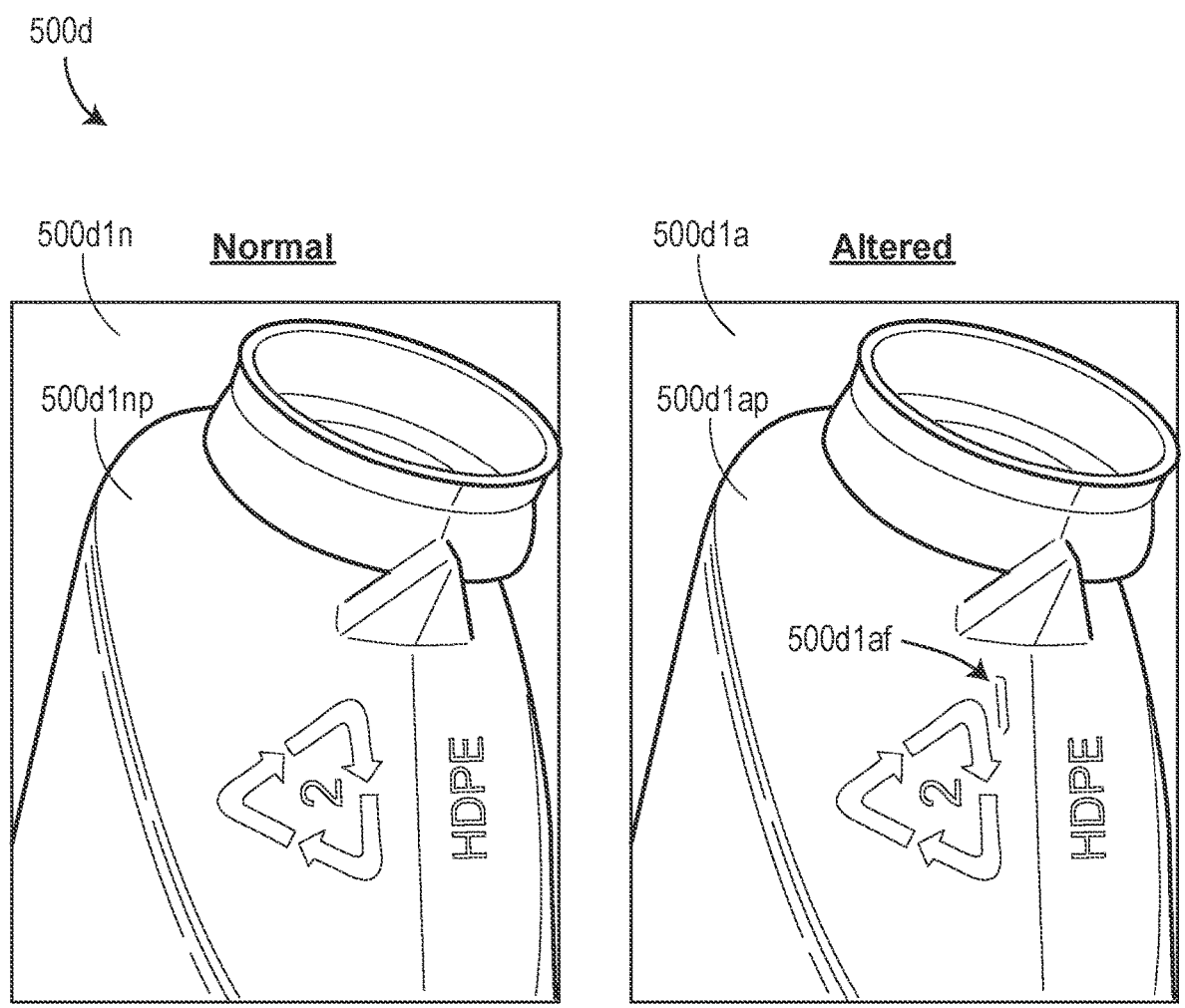
FIG. 5D illustrates example images of package alteration steganographic features in accordance with various aspects herein.

In some aspects, one or more of the plurality of training images may comprise multiple angles or perspectives of the product (e.g., Product 500d1ap as depicted in image 500d1a as described herein for FIGS. 2 and 5D). Such multiple angles of the product improve the accuracy of AI based imaging model 108 as the computing instructions is trained or otherwise configured to analyze new images, for authenticity or counterfeiting given images, where the new images may have been capture, by digital a camera, a various or multiple angles, perspectives, and/or different vantage points.

Additionally, or alternatively, one or more of the plurality of training images for training AI based imaging model 108 may each comprise a cropped image having a reduced pixel count compared with a respective original image. In such aspects, a cropped image would include steganographic features (e.g., any one or more of features 500af, 500ba1f, 500ba2f, 500ba3f, 500ba4f, 500ba5f, 500ba6f1, 500ba6f2, 500ba7f, 500c1af, 500c2af, 500d1af, 500ea1f, 500ea2f, 500fdm, 500fqr, and/or 500grf) for training or executing AI based imaging model 108 for detecting authentic or counterfeit products. For example, a cropped feature may comprise a portion of a product having one or more authentic steganographic features (e.g., product 500d1ap with feature 500d1af) or a portion of the product devoid of the one or more authentic steganographic features (e.g., product 500d1np lacking any such as feature 500d1af).

In some aspects, a plurality of training images may comprise a third subset of images, each depicting at least a portion of a given product having one or more real counterfeit features. In such aspects, AI based imaging model may be further trained with the third subset of images. In this way, AI based imaging model (e.g., AI based imaging model 108) may be updated, enhanced, or improved with additional training data, including additional images and/or features (or lack thereof) in order to improve the accuracy of AI based imaging model 108 to detect or determine whether the product is authentic or counterfeit based on the image classification.

In various aspects, AI based imaging model 108 preferably analyzes or uses a plurality of authentic steganographic features (e.g., two or more of features 500af, 500ba1f, 500ba2f, 500ba3f, 500ba4f, 500ba5f, 500ba6f1, 500ba6f2, 500ba7f, 500c1af, 500c2af, 500d1af, 500ea1f, 500ea2f, 500fdm, 500fqr, and/or 500grf), as potentially detected within an image, to determine whether a given product is authentic or counterfeit based on image classification. For example, AI based imaging model is preferably provided a new image having a plurality of steganographic features (or the lack thereof) and may detect the presence or absence of two or more (e.g., possibly six) features in order to detect or determine whether the product is authentic or counterfeit based on the image classification.

With reference to FIG. 3, at block 304, AI based steganographic method 300 includes receiving, by one or more processors (e.g., processor(s) of server 102 and/or user computing device 112c1), a new image (e.g., image 500d1a) of a product (e.g., product 500d1ap as depicted in image 500d1a as described herein for FIGS. 2 and 5D). The new image may comprise a digital image as captured by a digital camera (e.g., of user computing device 112c1). The new image may further comprise pixel data of at least a portion of the product features (e.g., product 500d1ap with pixel data corresponding to feature 500d1af).

With reference to FIG. 3, at block 306, AI based steganographic method 300 comprises analyzing, by the AI based imaging model (e.g., AI based imaging model 108), the pixel data of the new image (e.g., image 500d1a) for the pixel-based feature presence or absence of the one or more authentic steganographic features (e.g., feature 500d1af) to determine an image classification of the product. The image classification may be selected from the one or more image classifications of the AI based imaging model. For example, in various aspects, the image classifications may include one or more of: (1) a counterfeit product classification; and (2) an authentic product classification, as described herein for FIGS. 4A and 4B.

With reference to FIG. 3, at block 308, AI based steganographic method 300 comprises detecting, by the one or more processors, whether the product is authentic or counterfeit based on the image classification. Detection of whether a given product is authentic or counterfeit may be indicated via a display screen via a textual, graphical, or otherwise visual indication, for example, as described herein for FIG. 2, e.g., indication 210 and/or overlays or annotations of a given product image.

Figure 4A:
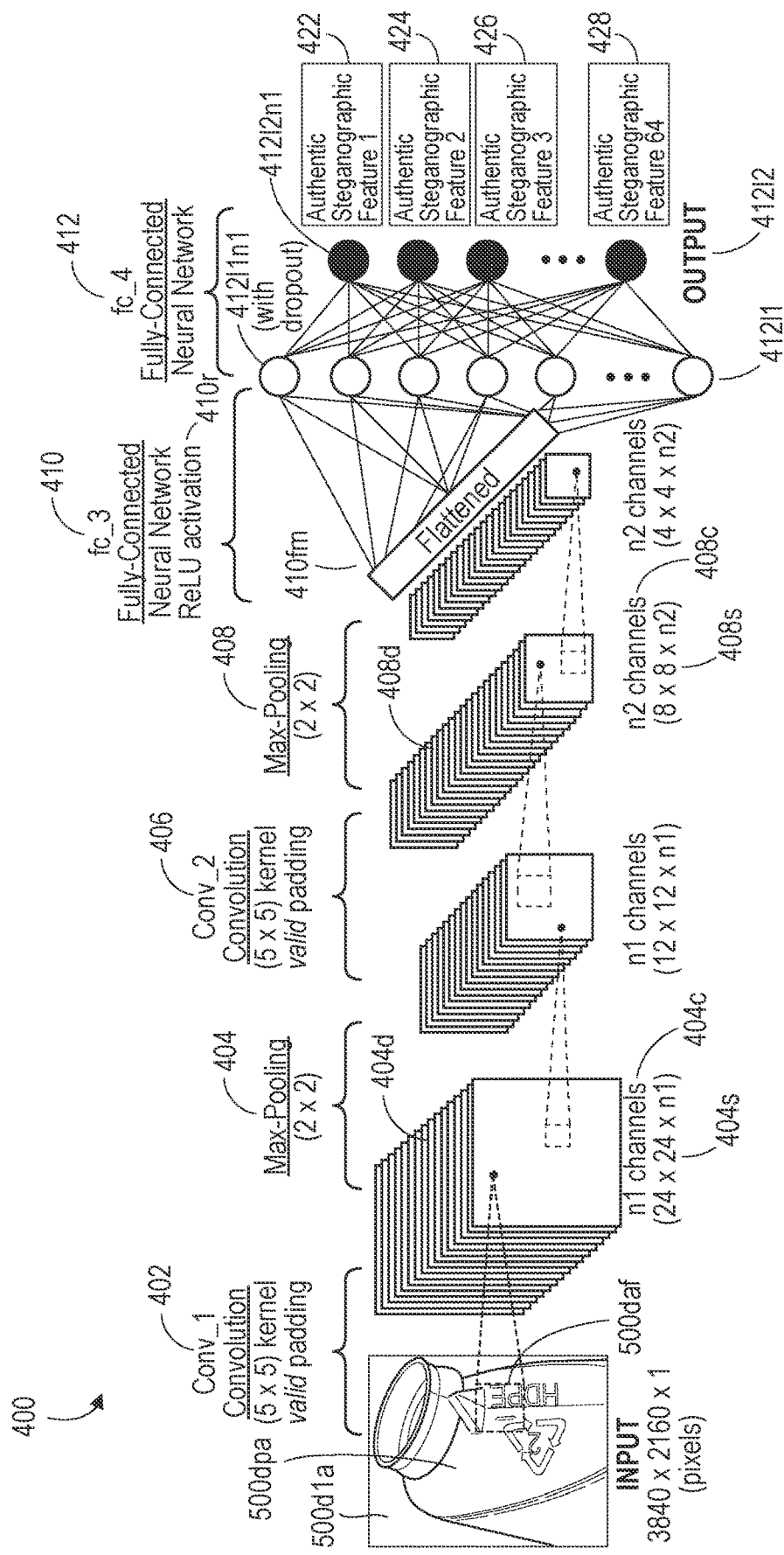
FIG. 4A illustrates an example AI based imaging model in accordance with various aspects disclosed herein.
Figure 4B:
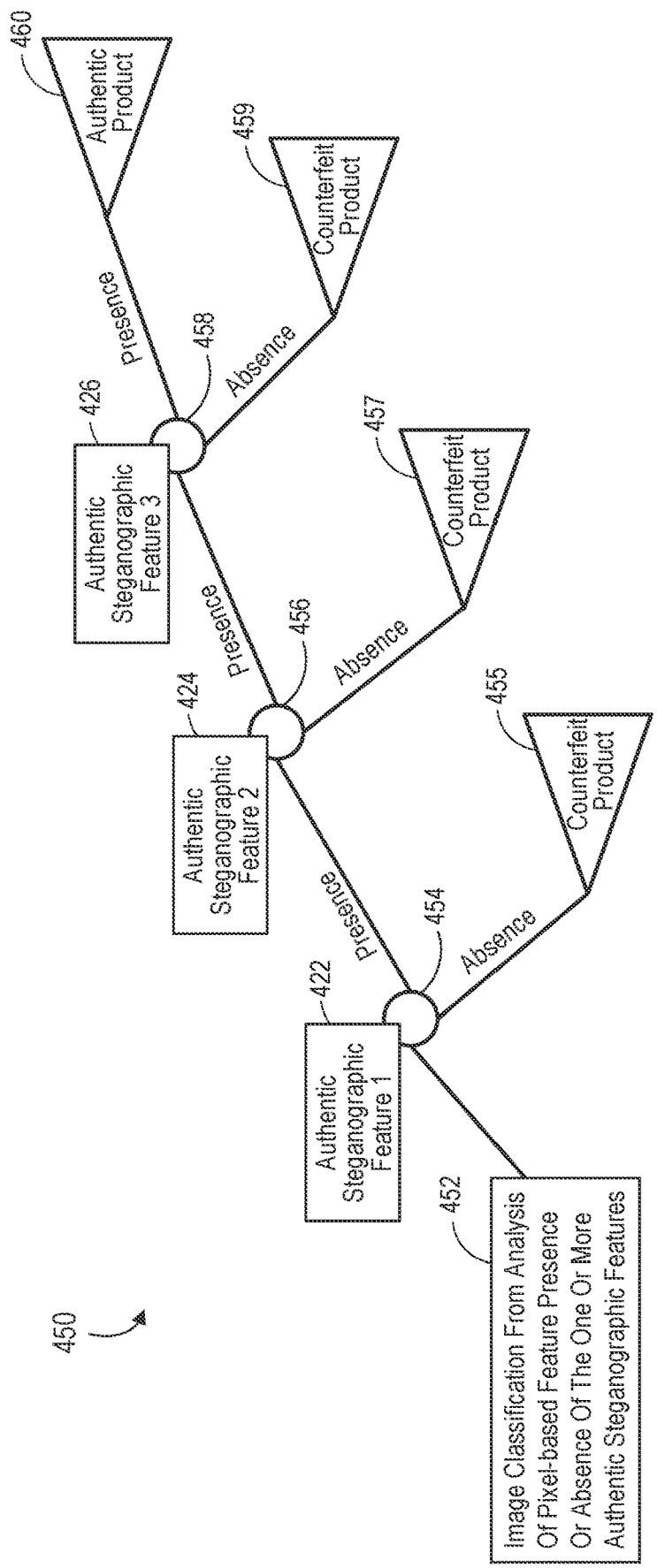
FIG. 4B illustrates an example decision tree for determining one or more one or more image classifications, in accordance with various aspects disclosed herein.

FIGS. 4A and 4B describe an example version of AI based imaging model 108, implemented as a CNN based AI model and a decision tree model, for analyzing a given (e.g., new) image and for detecting whether the product is authentic or counterfeit based on a determined image classification. With reference to FIGS. 4A and 4B, one or more processors (e.g., processor(s) of server 102 and/or user computing device 112c1) may train AI based imaging model 108 (e.g., as CNN model 400 of FIG. 4A) to detect and/or identify steganographic features (e.g., authentic steganographic features 1-64 (422-428), or the lack thereof, as described for FIG. 4A) for a given (e.g., suspect) image of a product. A decision tree (e.g., decision tree 450) may be used to detect whether the product is authentic or counterfeit based on the image classification of the various steganographic features (e.g., authentic steganographic features 1-64 (422-428).

FIG. 4A illustrates an example AI based imaging model (CNN model 400) in accordance with various aspects disclosed herein. In the example of FIG. 4A, AI based imaging model 108 may use a convolutional neural network ("ConvNet" or "CNN") model to classify images. CNNs comprise a machine learning type of predictive model that can be used for image recognition and classification. CNNs can operate on digital images, where, for example, such images are represented as pixel values. In certain aspects, CNN model 400 may be used to determine an image classification of the product based on authentic steganographic features 1-64 (422-428), or the lack thereof, of a provided image.

CNN model 400 may use the features learned from convolutional, pooling, and non-linearity, and/or fully connected operations or layers, as discussed below, for classifying or determining an input image (e.g., image 500$d1a$) into various classes based on a training dataset. Training a CNN can involve determining optimal weights and parameters of the CNN (as used in the various CNN operations described herein) to accurately classify images from the training set, and therefore, allow for better predictions. As described herein, the convolution, non-linearity, and pooling operators (e.g., any one or more of operations 402-408) act as feature extractors from an input image and the fully connected layer (e.g., neural network 412)) acts as a classifier. For example, when a new (unseen) image is input into a CNN, the CNN can perform a forward propagation to output a probability or value for each class (e.g., as output for authentic steganographic features 1-64 (422-428).

Generally, a CNN can be used to determine one or more classifications for a given image by passing the image through a series of computational operational layers. By training on and utilizing theses various layers, a CNN model can determine a probability that an image belongs to or is of a particular class.

Figure 5E:
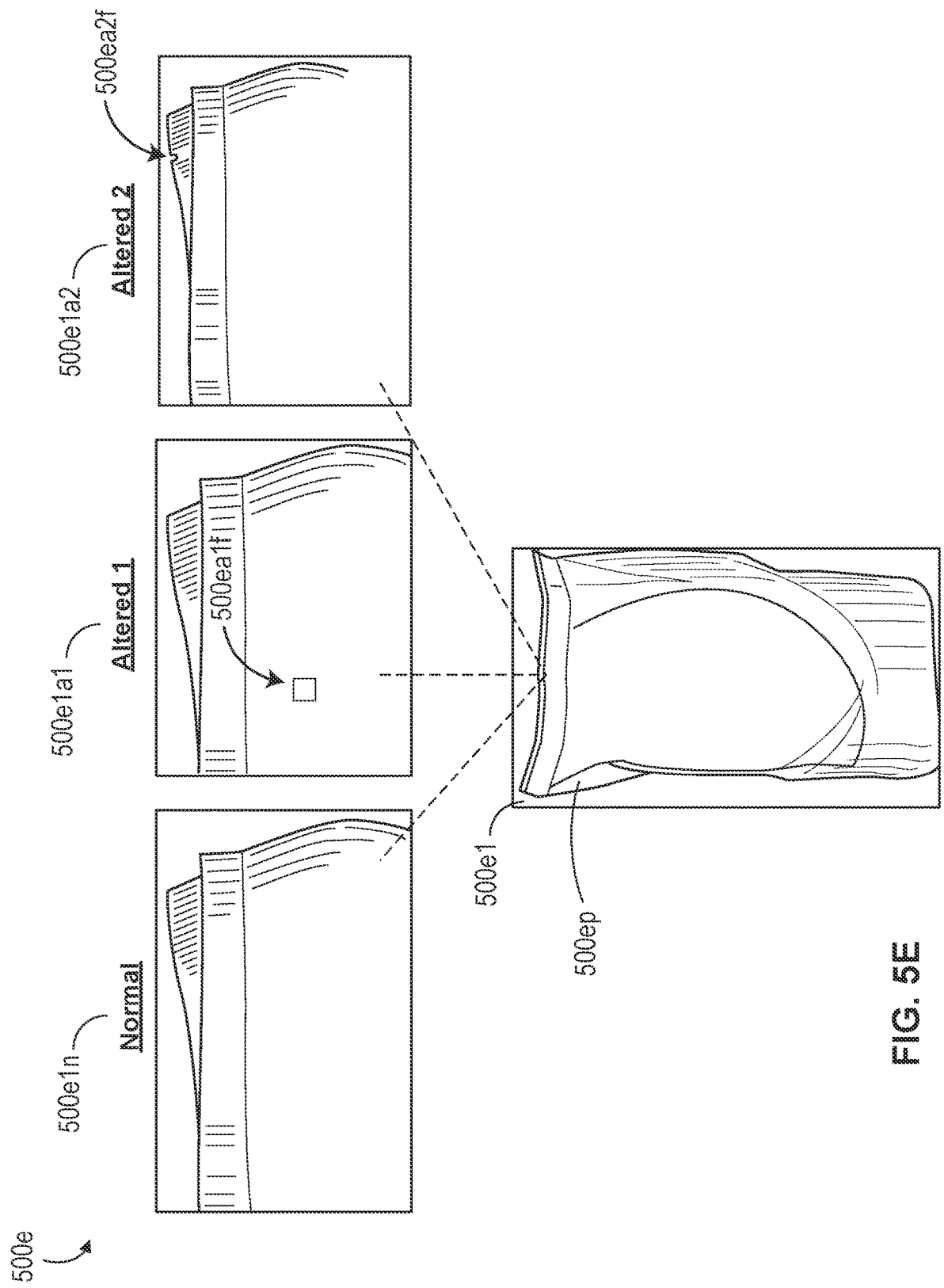
FIG. 5E illustrates further example images of package alterations based steganographic features in accordance with various aspects herein.

For example, CNN model 400 may be trained or otherwise configured to output image classifications corresponding to steganographic features. For example, authentic steganographic feature 1 422 may correspond to feature 500$d1af$ as shown in FIGS. 2 and 5D. Authentic steganographic feature 2 424 may correspond to feature 500$c1af$ as shown in FIG. 5C. Authentic steganographic feature 3 426 may correspond to feature 500$ea2f$ as shown in FIG. 5E. It is to be understood that CNN model 400 may output other classifications corresponding to other steganographic features, including those herein as described for FIGS. 5A to 5G.

CNN model 400 may be trained or otherwise configured to output image classification(s), which may include Boolean values, scalar values, percentage values, or other such values indicating the presence or absence of steganographic features (e.g., authentic steganographic features 1-64 (422-428) as detected or not detected within a given image).

More generally, for a given image or image data, a CNN can use several image processing operations at different or multiple layers of the CNN, which can include convolution (e.g., convolution operations 402 or 406), pooling (e.g., pooling operations 404 or 408), non-linearity (e.g., ReLU activation), and classification (e.g., classification with fully connected neural network 412). The convolution operation(s) can extract features (e.g., pixels) from an input image (e.g., image 500$d1a$). For example, image 500$d1a$ may comprise a 3840×2160 (4K) image as captured by an 8 mega-pixel digital camera (e.g., a digital camera of user computing device 112$c1$). It is to be understood, however, that other image sizes and dimensions as captured by other camera types, having different mega-pixel capabilities, may be used to capture images for inputting into CNN model 400.

Typically, a convolution operation preserves the spatial relationship between pixels of an image (e.g., image 500$d1a$) by learning image features using small squares of input data from an image (such as pixels or groups of pixels of an image, such as image 500$d1a$). The input data is taken from different portions (e.g., tiles or squares) of the original image where each input portion may be described as a "feature detector" (i.e., a "filter" or a "kernel"). The convolution operation applies (i.e., slides, in a graphical or positional operation) the filter across the pixels of the original image to generate one or more respective "convolved features" (i.e., "activation maps" or "feature maps") that describe the image. In this manner, the filters acts as feature detectors of the original input image, which may be used to determine items of interest (e.g., any one or more of steganographic features (e.g., features 500$af$, 500$ba1f$, 500$ba2f$, 500$ba3f$, 500$ba4f$, 500$ba5f$, 500$ba6f1$, 500$ba6f2$, 500$ba7f$, 500$c1af$, 500$c2af$, 500$d1af$, 500$ea1f$, 500$ea2f$, 500$fdm$, 500$fqr$, and/or 500$grf$) within any one or more of images 501$a1$, 500$ba1$-500$ba7$, 500$c1a$-500$c2a$, 500$d1a$, 500$e1a1$-500$e1a2$, 500$f1$-500$f2$, and/or 500$gc$ as described for FIGS. 5A to 5G).

A CNN model, such as CNN model 400, can learn the values of the filters on its own during the training process. Typically, the more filters (e.g., as determined by convolution operations 402 and 406), the more image features get extracted and the more improved a CNN model becomes at recognizing patterns or important features in images. The size 404$s$ of a feature map can be controlled by parameters determined before the convolution operation is performed and/or while the convolution operation is being performed. These parameters can include the "depth" (e.g., 404$d$ or 408$d$) of, or number of filters used, for the convulsion operation, which can be used to produce different feature maps. Feature maps may be envisioned as stacked 2D matrices (e.g., 404$d$ or 408$d$) of the image, so that a feature map using three filters would have a depth of three. Another parameter can be the "stride" value which is the number of pixels by which a filter slides over the image. Having a larger stride will produce smaller feature maps. Another parameter relates to "zero-padding," which is a method to pad the input image with zeros around the border. Padding allows control of the size of the feature maps. Another parameter is the number of channels (e.g., n1 404$c$ or n2 408$c$) which are the number of variations of a pixel or pixel area, such as color variations (e.g., RGB channels for different colors in the RGB color spectrum).

Pooling is another operation or layer (e.g., pooling operations 404 or 408) that can be used in a CNN model. Pooling (i.e., also "subsampling" or "downsampling") reduces the dimensions (e.g., number of pixel values) of each feature map but retains the most important information, such as the max, average, sum, etc. of the feature map, which may focus on the features of the images (e.g., features 500$af$, 500$ba1f$, 500$ba2f$, 500$ba3f$, 500$ba4f$, 500$ba5f$, 500$ba6f1$, 500$ba6f2$, 500$ba7f$, 500$c1af$, 500$c2af$, 500$d1af$, 500$ea1f$, 500$ea2f$, 500*fdm*, 500*fqr*, and/or 500*grf*). For example, in a max pooling aspect, the largest element from a rectified feature map (e.g., the greatest value in a tile or group of pixels) may be identified and used as the representative value for the entire tile or group. In another aspect, the average (Average Pooling) or sum of all elements in that group or tile could be used.

Pooling reduces the spatial size of the input representation and provides several enhancements to the overall CNN model, including making the input representations (feature dimension) smaller and more manageable, reducing the number of parameters and computations in the network, therefore, controlling overfitting, and making the CNN resilient to small distortions and translations in the input image. Thus, pooling allows detection of features, such as items of interest (e.g., any one or more of steganographic features within any one or more of images 501*a*1, 500*ba*1-500*ba*7, 500*c*1*a*-500*c*2*a*, 500*d*1*a*, 500*e*1*a*1-500*e*1*a*2, 500*f*1-500*f*2, and/or 500*gc* as described for FIGS. 5A to 5G)., in an image despite variances in images of a certain class.

Non-linearity is another operation or layer that can be used in a CNN model (e.g., AI based imaging model 108). This layer is used to introduce non-linearity in into a CNN model because most real-world images and image data comprise non-linear patterns. In contrast, the convolution operation is linear and provides an element-wise matrix multiplication and addition. Accordingly, non-linearity can be introduced into the model via a non-linear function 410*r* such as ReLU, Tan h, or Sigmoid to improve the accuracy of the prediction model. For example, ReLU stands for Rectified Linear Unit and is an element-wise operation (applied per pixel) and can replace all negative pixel values in the feature map with different values, such as a zero value. The output feature map of the ReLU function can be referred to as the 'Rectified' feature map 410*fm* which may be referred to as "flattened" data (such as data in an array) that can be used as input to a fully connected layer (e.g., a neural network 412) which can provide a classification or determination for a detected feature within an image (e.g., a classification or determination of one or more authentic steganographic features 1-64 (422-428) as detected or not detected within a given image).

In various aspects, multiples or permutations or numbers of convolution, non-linearity, and pooling operations and/or layers may be used to train or implement a CNN model (e.g., CNN model 400). For example, as shown in the example of 4A, image 500*d*1*a* is provided as input as a 3840×2160×1 pixel data. A first convolution operation (402) may include applying 5×5 filters to reduce the dimensionality of the image (referred to as "valid padding"). A max pooling operation (404) may be applied to analyze 2×2 tile portions of the output of the first convolution operation to determine the maximum value of each tile portion. In some aspects, convolution operation and max pooling operations (e.g., 406 and 408) may be applied to further reduce the dimensionality or refine important features with the pixel data. A ReLU function (410*r*) may then be applied to the pooled image data to provide non-linearity to pooled image data. Together these operations can extract the useful features from the images (e.g., items of interest, e.g., any one or more of steganographic features within any one or more of images 501*a*1, 500*ba*1-500*ba*7, 500*c*1*a*-500*c*2*a*, 500*d*1*a*, 500*e*1*a*1-500*e*1*a*2, 500*f*1-500*f*2, and/or 500*gc* as described for FIGS. 5A to 5G), to introduce non-linearity in the CNN model (e.g., CNN model 400), and can reduce feature dimension to enhance computing performance. The above operations can be repeated any number of times for a single CNN model.

For example, some CNN models may have tens of convolution and pooling layers. It is to be understood that, in different aspects, the ordering of the convolution, non-linearity, and pooling operations may differ. For example, it is not necessary to have a pooling operation after every convolutional operation.

The output from the convolutional, pooling, and non-linearity operations can represent high-level features of the input image and may further be used to generate a fully connected layer that ultimately provides the classification or determination value(s), e.g., classifying or determining pixel(s) as authentic steganographic features 1-64 (422-428), or the lack thereof. In CNNs, the term "Fully Connected" implies that every "neuron" (or node) (e.g., node 412/1*n*1) in the previous layer (e.g., layer 412/1), which can be an input layer, of a neural network (e.g., neural network 412) of CNN model 400 is connected to every neuron (e.g., node 412/2*n*1) on the next layer (e.g., node 412/2*n*2). For example, with respect to the above aspect, there may be 128 fully connected layers in layer 412/1 of neural network 412 where the layers are reduced ("dropout") in subsequent layers (e.g., 64 layers in layer 412/2). An output layer of the fully connected layer, such as the 64 node output layer (layer 412/2*n*1) of neural network 412, can be used to generate or provide classifications, determinations, and/or predictions from the CNN model, e.g., authentic steganographic features 1-64 (422-428), or the lack thereof. In some aspects, the values as output for each of the authentic steganographic features 1-64 (422-428), or the lack thereof, may be Boolean based, e.g., "1" or "0" (or "True" or "False") indicating detection or no detection, respectively, for a given feature in the image (e.g., image 500*d*1*a*). In other aspects, the values as output for each of the authentic steganographic features 1-4 422-428 may be scalar or percent based, such as a value from 0.00 to 1.00, or 0 to 100, indicating a magnitude or degree of presence (or absence) of a feature in the image (e.g., image 500*d*1*a*).

For a new image (e.g., image 500*dpa*), the output probabilities are calculated using weights as optimized to correctly classify all the previous training examples and/or minimize error within the CNN model 400. For example, with respect to detecting whether a product is authentic or counterfeit based on the image classification, in one aspect, training and testing a CNN may include taking a large image data set, such as 10,000 s images of (1) a first subset of images (e.g., comprising any one or more of images 501*a*1, 500*ba*1-500*ba*7, 500*c*1*a*-500*c*2*a*, 500*d*1*a*, 500*e*1*a*1-500*e*1*a*2, 500*f*1-500*f*2, and/or 500*gc* as described for FIGS. 5A to 5G) each depicting at least a portion of the product having one or more authentic steganographic features, and (2) a second subset of images (e.g., any one or more of images 500*bn*, 500*c*1*n*-500*c*2*n*, 500*d*1*n*, 500*e*1*n*, and/or 500*gr* as described for FIGS. 5A to 5G) each depicting at least a portion of the product devoid of the one or more authentic steganographic features. The input data set may be split into training and validation sets and a test set. The filters and weights of a raw CNN model may first be initialized with random values. Using the test set as input, the CNN may then be forward propagated by applying the training set to the convolution, ReLU, pooling, and fully connected operations to determine output probabilities for each of a number of classifications. At this point, a "backpropagation" technique can be used to calculate the error rates with respect to all weights in the network. Accordingly, an error rate for each of the random output probabilities can be determined by comparing, for each image, the predicted class to the actual class that the image belongs to. A total error of the model may then be computed based on the various error rates. All filter values and weights are updated in the CNN to minimize the total output error. The weights and other values can be adjusted in proportion to their contribution to the total error to minimalize the total error of the model.

After the model (e.g., CNN model 400) has been trained by reducing the error rate, the validation set may then be input to test the updated model, which can give different output values or probabilities that are more accurate with respect to the actual image. In this way, the validation set can be used to further train the CNN model to classify particular images correctly by adjusting the model's weights or filters such that the output error is further reduced. In some aspects, parameters like the number of filters, filter sizes, architecture of the network may all be fixed before the CNN model is trained and, thus, does require updates during training process. In such an aspect, only the values associated with the filters and weights of the CNN get updated.

Finally, the test data set may then be used to further determine the accuracy of the CNN model, e.g., whether and to what extent the CNN model correctly classifies new images.

One or more processors (e.g., processor(s) of server 102 and/or user computing device 112c1) may be configured to train CNN model 400 and/or generate any of the predictions, classifications, or determinations as output by CNN model 400 as described herein.

FIG. 4B illustrates an example decision tree 450 or otherwise algorithm for determining one or more one or more image classifications, in accordance with various aspects disclosed herein. In some aspects, algorithm 450 may comprise a portion of AI based imaging model 108 or CNN model 400. In other aspects, algorithm may be implemented, executed, and/or stored in memory separate from based imaging model 108 and/or CNN model 400.

Decision tree 450 provides, outputs, or otherwise determines an image classification of an image (e.g., image 500d1au) taking, or based on, the output from CNN model 400. In various aspects, the classification determined may comprise one or more of: (1) a counterfeit product classification; and (2) an authentic product classification. Such classification is used, e.g., by one or more processors (e.g., processor(s) of server 102 and/or user computing device 112c1) to detect whether a product (e.g., product 500dpa) in the image is authentic or counterfeit.

For example, decision tree 450 begins (452) by analysis of one or more output values CNN model 400, e.g., authentic steganographic feature 1 422 at decision node 454. The value of authentic steganographic feature 1 422 may be Boolean based (e.g., "0" or "1"; or "True" or "False") or may be scalar or percent based, such as a value from 0.00 to 1.00, or 0 to 100, indicating a magnitude or degree of presence (or absence) of a feature in the image (e.g., image 500d1a). In instances where the authentic steganographic feature 1 422 is present, e.g., as indicated by a positive Boolean value (e.g., "True" or "1"; or where the scalar or percent based value crosses a threshold amount, e.g., 0.75 or 75%), then the decision tree 450 algorithm proceeds to analyze where the next authentic steganographic feature is present. Otherwise, if authentic steganographic feature 1 422 is absent, e.g., as indicated by a negative Boolean value ("False" or "0"); or where the scalar or percent based value is below a threshold amount, e.g., 0.75 or 75%, then decision tree 450 algorithm ends, and a counterfeit product classification 455 (indicating a counterfeit product is detected within the image) is output or otherwise provided.

Assuming that authentic steganographic feature 1 422 is detected within the image, then analysis of a value of authentic steganographic feature 2 424 at decision node 456 begins. The value of authentic steganographic feature 1 424 may be Boolean based (e.g., "0" or "1"; or "True" or "False") or may be scalar or percent based, such as a value from 0.00 to 1.00 or 0 to 100 indicating a magnitude or degree of presence (or absence) of a feature in the image (e.g., image 500d1a). In instances where the authentic steganographic feature 1 424 is present, e.g., as indicated by a positive Boolean value (e.g., "True" or "1"); or where the scalar or percent based value crosses a threshold amount (e.g., 0.60 or 60%) then the decision tree 450 algorithm proceeds to analyze where the next authentic steganographic feature is present. Otherwise, if authentic steganographic feature 1 424 is absent, e.g., as indicated by a negative Boolean value (e.g., "False" or "0"); or where the scalar or percent based value is below a threshold amount, (e.g., 0.60 or 60%), the decision tree 450 algorithm ends, and a counterfeit product classification 457 (indicating a counterfeit product is detected within the image) is output or otherwise provided.

Assuming that authentic steganographic feature 1 426 is detected within the image, then analysis of a value of authentic steganographic feature 3 426 at decision node 458 begins. The value of authentic steganographic feature 1 426 may be Boolean based (e.g., "0" or "1"; or "True" or "False") or may be scalar or percent based, such as a value from 0.00 to 1.00 or 0 to 100 indicating a magnitude or degree of presence (or absence) of a feature in the image (e.g., image 500d1a). In instances where the authentic steganographic feature 1 426 is present, e.g., as indicated by a positive Boolean value (e.g., "True" or "1"); or where the scalar or percent based value crosses a threshold amount (e.g., 0.90 or 90%) then the decision tree 450 algorithm proceeds to analyze where the next authentic steganographic feature is present. Otherwise, if authentic steganographic feature 1 426 is absent (e.g., as indicated by a negative Boolean value (e.g., "False" or "0"), or where the scalar or percent based value is below a threshold amount (e.g., 0.90 or 90%), the decision 450 algorithm ends, and a counterfeit product classification 459 (indicating a counterfeit product is detected within the image) is output or otherwise provided.

After all authentic steganographic features (e.g., authentic steganographic features 1-3 (422-426)) have been analyzed and determined to be present, then AI based imaging model 108 an/or otherwise one or more processors (e.g., processor(s) of server 102 and/or user computing device 112c1) implementing decision 450 algorithm output an authentic product classification 460 for the product.

The image classification of the product (e.g., whether such classification be one of counterfeit product classification 455-459 or authentic product classification 460) may be used to detect whether the product (e.g., product 500dpa) is authentic or counterfeit based on the image classification.

It is to be understood that additional or fewer decision nodes, layers, branches, or otherwise blocks may be used for decision tree 450, such that any and all levels and/or numbers of nodes or branches are contemplated herein, for use in determining or detecting whether a product is authentic or counterfeit based on the image classification.

FIGS. 5A-5G illustrate example images of steganographic features. In particular, FIGS. 5A-5G illustrate example images that may be used to train and/or execute AI based imaging model 108, where such images comprise a first subset of images each depicting at least a portion of the product having one or more authentic steganographic features, and (2) a second subset of images each depicting at least a portion of the product devoid of the one or more authentic steganographic features, or that otherwise comprise pixel-based presence or absence of one or more authentic steganographic features within the images as described herein. It is to be understood the disclosure for the example images of FIGS. 5A-5G are exemplary in nature, and that other similar or different images of products and/or steganographic features, may also be analyzed or used, such as for training or execution of AI based imaging model 108, CNN model 400, and/or decision tree 450 as described herein.

In various aspects, images of FIGS. 5A-5G may comprise images captured by a digital camera as described herein. For example, pixel data may be captured by a digital camera of one of the user computing devices (e.g., one or more user computer devices 112c1-112c3). Any of images of FIGS. 5A-5G may be transmitted to server(s) 102 via computer network 120, as shown for FIG. 1.

Additionally, or alternatively, any of images of FIGS. 5A-5G, and/or their respective steganographic feature(s), may be generated from other images, updated, and/or annotated as described herein. For example, one or more authentic steganographic features of the images may be generated by selecting or altering one or more predetermined steganographic features. Additionally, or alternatively, images devoid of authentic steganographic features may comprise synthetic images generated by deleting or annotating at least a portion of the one or more predetermined steganographic features from images that originally depicted such features. Still further, additionally or alternatively, images devoid of authentic steganographic features may comprise synthetic images generated by deleting or annotating at least a portion of the one or more authentic steganographic features. Still further, images devoid of authentic steganographic features may comprise a visual or pixel difference from the images having authentic steganographic features based on the pixel-based feature presence or absence of the one or more authentic steganographic features within a given image or set of images. It is to be understood that any number of images having steganographic feature(s) and/or not having (devoid of) steganographic feature(s) may be generated and created by adding and/or deleting such features to existing images to thereby create images for training AI models, e.g., AI based imaging model 108 and/or CNN model 400, etc. In various aspects, such steganographic features may be added or altered by modifying normal (non-modified or original) artworks or batch codes to produce steganographic codes for printing on products and/or substrates of products to provide anti-counterfeit measures as described herein.

The images of FIGS. 5A-5G comprise pixel data that may be used for training and/or implementing AI based imaging model 108 and/or CNN model 400 as described herein. That is, each of the images of FIGS. 5A-5G may comprise pixel data (e.g., red-green-blue (RGB) data) comprising feature data corresponding to steganographic features, or the lack thereof, within the respective image. Generally, with respect to digital images as described herein, pixel data (e.g., pixel data of packaging alteration feature 500af of the image of FIG. 4A) comprises individual points or squares of data within an image, where each point or square represents a single pixel (e.g., each of pixel of packaging alteration feature 500af of the image of FIG. 4A) within an image. Each pixel may be at a specific location within an image. In addition, each pixel may have a specific color (or lack thereof). Pixel color, may be determined by a color format and related channel data associated with a given pixel. For example, a popular color format includes the RGB format having red, green, and blue channels. That is, in the RGB format, data of a pixel is represented by three numerical RGB components (Red, Green, Blue), that may be referred to as a channel data, to manipulate the color of a pixel's area within the image. In some implementations, the three RGB components may be represented as three 8-bit numbers for each pixel. Three 8-bit bytes (one byte for each of RGB) may be used to generate 24 bit color. Each 8-bit RGB component can have 256 possible values, ranging from 0 to 255 (i.e., in the base 2 binary system, an 8 bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24 bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges.

As a whole, the various pixels, positioned together in a grid pattern (e.g., pixel data of packaging alteration feature 500af of the image of FIG. 4A), form a digital image or portion thereof. A single digital image can comprise thousands or millions of pixels. Images can be captured, generated, stored, and/or transmitted in a number of formats, such as JPEG, TIFF, PNG and GIF. These formats use pixels to store or represent the image.

In some aspects, images, such as those of FIGS. 5A-5G, may be collected or aggregated at imaging server(s) 102 and may be analyzed by, and/or used to train, an AI based imaging model (e.g., an AI model such as a CNN imaging model, e.g., example decision tree 450 as describe herein).

FIG. 5A illustrates an example image 500a of printed symbol steganographic features in accordance with various aspects herein. Image 500a depicts one or more authentic steganographic features as printed symbols 500af. In image 500a, printed symbols 500af are depicted as printed on a product, e.g., a bottom substrate of a shampoo bottle. Printed symbols 500af comprise extra printed symbols or unique patterns, in which a specific arrangement, number of dots, positioning, sizing, and/or other attributes of the printed symbol indicate authenticity (or the lack thereof, if such patterns are different from an expected or predefined printed symbol) of the given product (e.g., 500ap). The printed symbols may be printed using a printer (e.g., printer 130), such as online printer, continuous inkjet, laser printer, thermal transfer printer, embossed printer, etc. More generally, printed symbols may comprise punctuation, such as a period, dot, hyphen, or explanation point, etc.

FIG. 5B illustrates example images 500b of alphanumeric, textual characters, and font based steganographic features in accordance with various aspects herein. Images 500b correspond to a set or subset of images showing examples of alphanumeric, textual characters, and font based steganographic features as may be printed on a product and/or substrate of a product. For example, image 500bn depicts a normal (non-altered) set of alphanumeric values, textual characters, and fonts and each of images 500ba1 to 500ba7 depict altered sets of alphanumeric values, textual characters, and fonts comprising steganographic features, which may correspond to authentic steganographic features as described herein.

For example, such steganographic features comprise alterations to image 500bn including, e.g., a different font for selected characters (feature 500ba1f of image 500ba1), which may be, for example, either a standard tru-type font or bespoke font; different size(s) for selected characters (feature 500ba2f of image 500ba2); different colour(s) for selected characters (feature 500ba3f of image 500ba3); displacement/orientation for selected characters (feature 500ba4f of image 500ba4 and feature 500ba5f of image 500ba5); additional seemingly random elements added (features 500ba6/1 and 500ba6/2 of image 500ba6); and/or bolding of some characters (feature 500ba7f of image 500ba7).

FIG. 5C illustrates example images of graphical alternation steganographic features in accordance with various aspects herein. Images 500c correspond to a set or subset of images showing examples of graphical alterations that provide steganographic features as may be printed or otherwise affixed on a product and/or substrate of a product. For example, image 500c1n depicts a normal (non-altered) graphic logo 500c1n. Image 500c1a depicts an alternate graphic logo having altered steganographic feature 500c1af, which may be used or implemented as an authentic steganographic feature as described herein. Similarly, image 500c2n depicts a normal (non-altered) graphic 500c2n. Image 500c2a depicts an alternate graphic having altered steganographic feature 500c2af, which may be used or correspond to an authentic steganographic feature as described herein.

In some aspects, each of images 500c1a and 500c2a are examples of images that comprise synthetic images generated by deleting or annotating at least a portion of an image or its features (e.g., as depicted for features 500c1af and 500c2af, respectively), which, in some aspects, may include predetermined steganographic features selected for deletion or alteration. In this way, such synthetic images may be used to train AI based imaging model 108 as described herein.

Additionally, or alternatively, images 500c1a and 500c2a are examples of images that comprise synthetic images generated by deleting or annotating at least a portion of one or more authentic steganographic features (e.g., as depicted for features 500c1af and 500c2af, respectively) as identifiable in an existing, known, first subset of images. Such synthetic images may also be used to train AI based imaging model (e.g., AI based imaging model 108 and/or CNN model 450 as described herein).

Generally, synthetic images comprise an image, artwork, or printed code without known authentic features. In various aspects, AI based imaging model 108 is trained to recognize whether steganographic features are there or not, based on the presence or absence of such features as determined by image pixel data. In this way, two training sets of synthetic data are generated for training AI based imaging model 108 where one set has the features in the artwork (or other printed codes), and the other set has no features. AI based imaging model 108 and CNN model 400 is trained to learn learns to recognize if the features are present or not, thus allowing for counterfeit classification based on imaging as described herein.

FIG. 5D illustrates example images 500d of package alteration steganographic features in accordance with various aspects herein. Images 500d correspond to a set or subset of images showing examples of package alteration of a product and/or substrate of a product. For example, image 500d1n depicts a normal (non-altered) product 500d1np and image 500d1a depicts an image of an altered product 500d1ap product having a steganographic feature (e.g., feature 500d1af, comprising a raised bump or indentation), which may correspond to authentic steganographic feature as described herein. Products 500d1np and 500d1ap, depicted in FIG. 5D, may correspond to a same or different consumer good product and/or a container for holding such product.

Examples of packaging alteration related features include, but are not limited to, additions(s) of seemingly random or extra texture/elements on the product or substrate of the product; alteration(s) of indented or textured symbols on the product or substrate of the product; alteration(s) of shapes of cuts in to the product or substrate of the product; and/or alteration(s) of embossing to the product or substrate of the product. Such packaging alternations may be made to, e.g., plastic, cardboard, or other physical portions of the product and/or its packaging.

FIG. 5E illustrates further example images of package alterations based steganographic features in accordance with various aspects herein. Images 500e correspond to a set or subset of images showing examples of package alteration of a product 500ep and/or substrate of the product 500ep as shown in image 500e1. For example, image 500e1n depicts a normal (non-altered) top portion of product 500e1. Image 500e1a1 depicts an image of an altered top portion product 500ep having a steganographic feature (e.g., feature 500ea1f, comprising a texture alteration or heat sealing alteration), which may correspond to an authentic steganographic feature as described herein. Similarly, image 500e1a2 depicts an image of an altered top portion product 500ep having a steganographic feature (e.g., feature 500ea2f, comprising a cut edge), which may correspond to an authentic steganographic feature as described herein.

More generally, and as exemplified by the differences in package alternations between images 500d1n and image 500d1a of FIG. 5D, and 500e1n compared to 500e1a1 and 500e1a2 of FIG. 5E, such product alterations, or other modifications as described herein, comprise a visual or pixel difference, within the respective images, the differences depicting an image of a normal product (e.g., 500d1n and 500e1n, respectively) and an image of altered product (e.g., image 500d1a, 500e1a1, and 500e1a2, respectively) illustrating pixel-based feature presence or absence of the one or more authentic steganographic features (e.g., feature 500d1af, feature 500ea1f, and feature 500ea2f, respectively). Such pixel differences may be used to train AI based imaging model 108 as described herein. In addition, such pixel differences are also used to classify images, using AI based imaging model 108, CNN model 400, and/or example decision tree 450 to detect whether a product is authentic or counterfeit based on image classification as described herein.

Figure 5F:
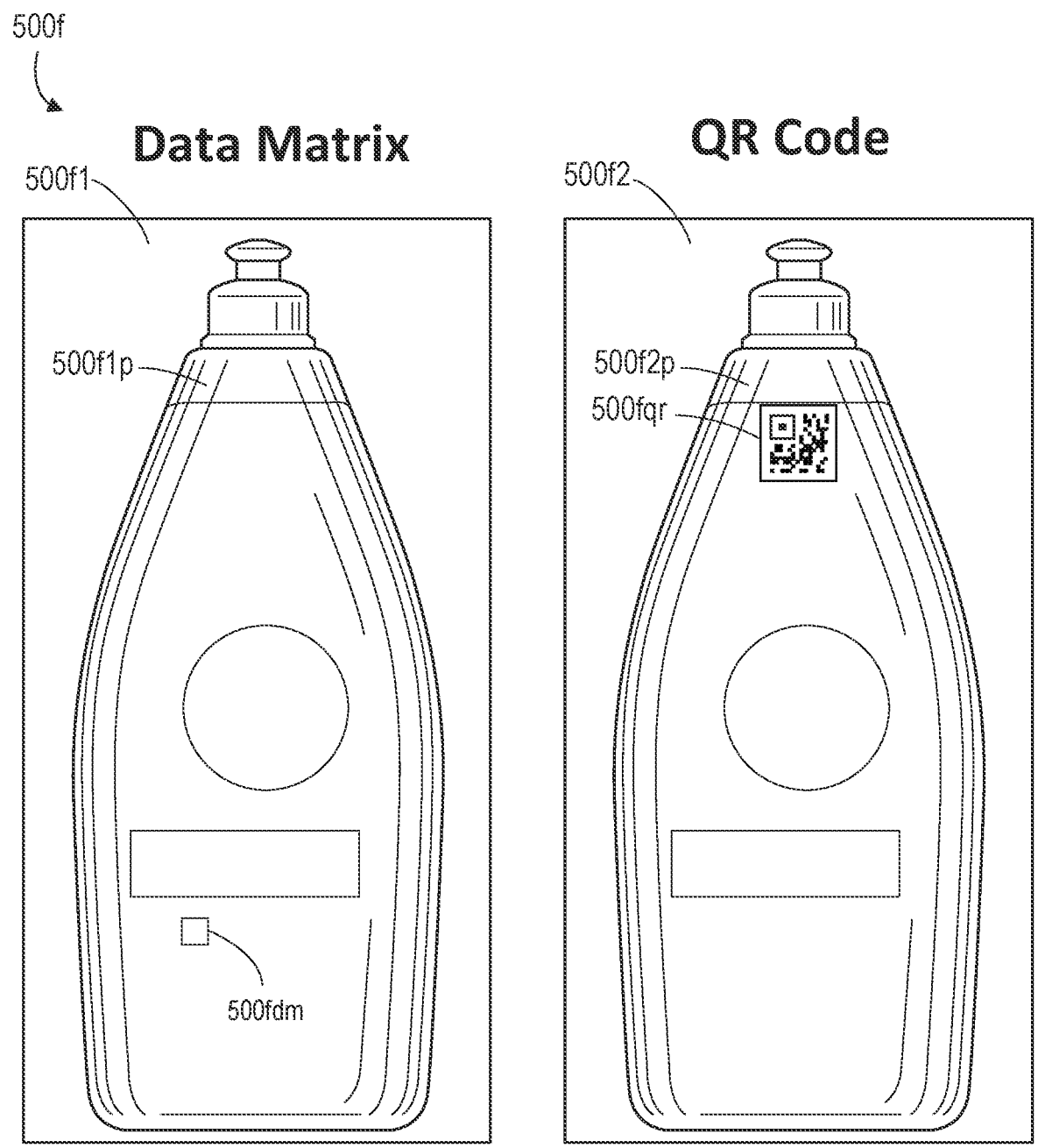
FIG. 5F illustrates example images of QR code, data matrix code, or otherwise scannable code based steganographic features in accordance with various aspects herein.

FIG. 5F illustrates example images of QR code, data matrix code, or otherwise scannable codes based steganographic features in accordance with various aspects herein. Images 500f includes examples of QR codes, data matrix codes, or otherwise scannable codes that may comprise steganographic features. For example, image 500f1 depicts product 500f1p having affixed thereon a data matrix code 500fdm. Image 500f2 depicts product 500f2p having affixed thereon a QR code 500fqr. Steganographic features may be printed as part of the data matrix code and/or QR code, such as part of the alphanumeric code or other information of these scannable, 2D codes. Additionally, or alternatively, a data matrix code or QR code may be printed in a proximity to, such as alongside, an alphanumeric code on the product. That is, in some aspects, a data matrix code (e.g., data matrix code 500fdm) or QR code (e.g., QR code 500fqr) may be printed alongside an alphanumeric code of the product (wherein the alphanumeric code may include a batch code, date, time etc., so the each of the alphanumeric codes are serialized). In other aspects, the data matrix code or QR code could contain the alphanumeric code. In such aspects, the steganographic feature may be found within the printed alphanumeric code. Such data matrix codes (e.g., data matrix code 500fdm) and/or QR codes could provide the advantage of allowing a scanner or printer to better align the image to read the alphanumeric code (including any steganographic features embedded therein (e.g., font style, off set printed etc.) in conjunction with the positioning of the data matrix code and/or QR code. In addition, the positioning such data matrix codes (e.g., data matrix code 500fdm) and/or QR codes, relative to other features or portions of a product, may provide an authenticating feature(s) in and of themselves.

In a specific aspect, a two dimensional (2D) data matrix or a QR code may be depicted in a proximity of one or more of the authentic steganographic features of a product (e.g., such as any one of the steganographic features as described herein for FIGS. 5A to 5G). Computing instructions of the steganographic app, when executed by the one or more processors, may be configured to cause the one or more processors to detect whether a product (e.g., product 500f1p) is authentic or counterfeit by analyzing an alignment or position of the 2D data matrix or QR code, respectively, with respect to the one or more of the authentic steganographic features. Such alignment or position may then be used to determine or classify, e.g., by AI based imaging model 108, CNN model 400, and/or example decision tree 450 whether product is authentic or counterfeit.

Figure 5G:
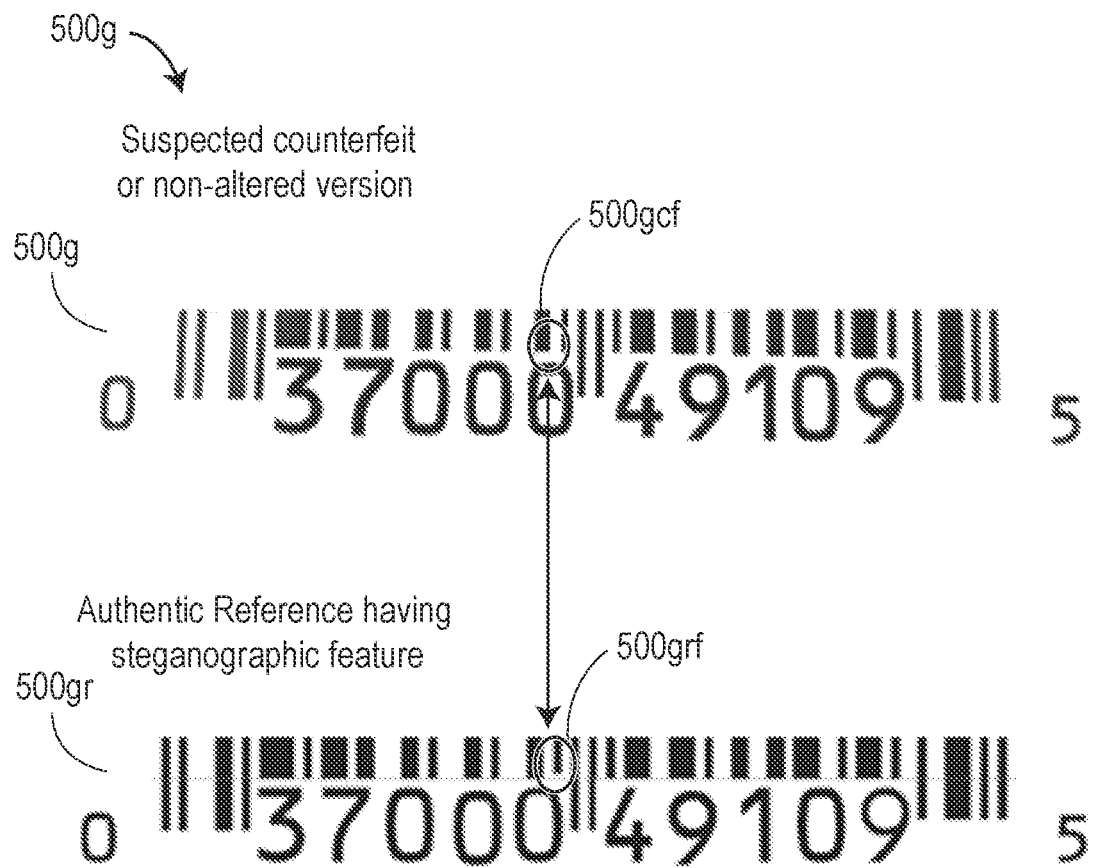
FIG. 5G illustrates example images of barcode based steganographic features in accordance with various aspects herein.

FIG. 5G illustrates example images of barcode based steganographic features in accordance with various aspects herein. Images 500g correspond to a set or subset of images showing examples of barcode based steganographic features, having differences in one or more portions of a barcode, as may be printed on a product and/or substrate of a product. For example, image 500gc depicts a normal (non-altered) bar code. Image 500gr depicts an altered, modified, or reference bar code, where the barcode in image 500gr includes a shortened bar 500grf compared to the non-shortened bar 500gcf in the image of 500gc. The shortened bar in image 500gr may represent an authentic feature as used to authenticate a product to which image 500gr is affixed. In contrast, non-shortened bar 500gcf may represent a non-authentic feature suggesting that the product to which image 500gc is affixed is a counterfeit product. In this way, shortened bar 500grf may correspond to an authentic steganographic feature as described herein, where the pixel difference between the image 500gr and image 500gc may be used to detect whether a product is authentic or counterfeit based on image classification of the pixels of those images.

Additionally, or alternatively, image 500gc may represent a standard bar code image from which an authentic steganographic feature(s) (e.g., shortened bar 500grf) are generated by selecting or altering one or more predetermined steganographic features (e.g., the predetermined steganographic features), in this example, comprising shortening one or more bars of the bar code of image 500gc). It is to be understood that other alternations to barcodes (or other features) are contemplated herein, for example, shortening, lengthening, repositioning, or other alterations to a barcode that allows the barcode to remain functional (e.g., scannable) but also allows for the modification or otherwise inclusion of steganographic features.

In is to be understood that other aspects for generating authentic steganographic feature(s), in addition to, or different from, those of the examples of images of FIGS. 5A to 5G, are contemplated herein. Such images comprise or include visual differences included or generated for steganographic purposes and related image classification of the pixels of those images for counterfeit detection purposes as described herein.

More generally, visual or pixel difference(s) between the images may be generated by modifying or deleting features of a set of base images. For example, in some aspects, visual or pixel difference(s) between the images may be generated where a base set of images, e.g., a first subset of images (e.g., any one or more of images 500a1, 500ba1-500ba7, 500c1a-500c2a, 500d1a, 500e1a1-500e1a2, 500f1-500f2, and/or 500gc as described for FIGS. 5A to 5G), each depicting at least a portion of the product having one or more authentic steganographic features, are altered, such as by modifying or deleting features, such that the base set of images become, or cause to be generated, a new set of images, e.g., a second subset of images (e.g., any one or more of images 500bn, 500c1n-500c2n, 500d1n, 500e1n, and/or 500gr as described for FIGS. 5A to 5G), each depicting at least a portion of the product devoid of the one or more authentic steganographic features. Such images and features may be used to train AI based imaging model 108, CNN model 400, and/or example decision tree 450.

Additionally, or alternately, visual or pixel difference(s) between the images may be generated through one or more iterations of a generative adversarial network (GAN), where a base set of images, e.g., a first subset of images (e.g., any one or more of images 501a1, 500ba1-500ba7, 500c1a-500c2a, 500d1a, 500e1a1-500e1a2, 500f1-500f2, and/or 500gc as described for FIGS. 5A to 5G), each depicting at least a portion of the product having one or more authentic steganographic features, are altered, such as by modifying or deleting features over multiple iterations of a GAN, such that the base set of images become, or cause to be generated, a new set of images, e.g., a second subset of images (e.g., any one or more of images 500bn, 500c1n-500c2n, 500d1n, 500e1n, and/or 500gr as described for FIGS. 5A to 5G), each depicting at least a portion of the product devoid of the one or more authentic steganographic features. Such images and features may be used to train AI based imaging model 108, CNN model 400, and/or example decision tree 450.

ASPECTS OF THE DISCLOSURE

The following aspects are provided as examples in accordance with the disclosure herein and are not intended to limit the scope of the disclosure.

1. An artificial intelligence (AI) based steganographic system configured to analyze pixel data of a product to detect product counterfeiting, the AI based steganographic system comprising: one or more processors; a steganographic application (app) comprising computing instructions configured to execute on the one or more processors; and an AI based imaging model, accessible by steganographic app, and trained with pixel data of a plurality of training images comprising (1) a first subset of images each depicting at least a portion of the product having one or more authentic steganographic features, and (2) a second subset of images each depicting at least a portion of the product devoid of the one or more authentic steganographic features, wherein the AI based imaging model is configured to output one or more image classifications corresponding to a pixel-based feature presence or absence of the one or more authentic steganographic features, wherein the computing instructions of the steganographic app, when executed by the one or more processors, are configured to cause the one or more processors to: receive a new image of the product, the new image comprising a digital image as captured by a digital camera, and the new image comprising pixel data of at least a portion of the product, analyze, by the AI based imaging model, the pixel data of the new image for the pixel-based feature presence or absence of the one or more authentic steganographic features to determine an image classification of the product, the image classification selected from the one or more image classifications of the AI based imaging model, and detect whether the product is authentic or counterfeit based on the image classification.

2. The AI based steganographic system of aspect 1, wherein the computing instructions of the steganographic app, when executed by the one or more processors, are further configured to cause the one or more processors to: select a set of the one or more authentic steganographic features for printing on a different version of the product, and generate a print submission for printing or augmenting, by a printer on a substrate of the different version of the product, the set of the one or more authentic steganographic features.

3. The AI based steganographic system as in any one of aspects 1-2, wherein the one or more authentic steganographic features of the first subset of images are generated by selecting or altering one or more predetermined steganographic features.

4. The AI based steganographic system of aspect 3, wherein the second subset of images comprise synthetic images generated by deleting or annotating at least a portion of the one or more predetermined steganographic features.

5. The AI based steganographic system as in any one of aspects 1-4, wherein the second subset of images comprise synthetic images generated by deleting or annotating at least a portion of the one or more authentic steganographic features.

6. The AI based steganographic system as in any one of aspects 1-5, wherein each of the second subset of images comprise a visual or pixel difference from the each of the first subset of images based on the pixel-based feature presence or absence of the one or more authentic steganographic features.

7. The AI based steganographic system of aspect 6, wherein the visual or pixel difference is generated through one or more iterations of a generative adversarial network (GAN).

8. The AI based steganographic system as in any one of aspects 1-7, wherein the one or more image classifications comprise one or more of: (1) a counterfeit product classification; and (2) an authentic product classification.

9. The AI based steganographic system as in any one of aspects 1-8, wherein the plurality of training images further comprises a third subset of images each depicting at least a portion of the product having one or more real counterfeit features, and where the AI based imaging model is further trained with the third subset of images.

10. The AI based counterfeit detection system as in any one of aspects 1-9, wherein the one or more authentic steganographic features comprise at least one of: (1) one or more portions of a barcode; (2) one or more portions of a QR code; (3) one or more portions of a data matrix code; (4) one or more portions of a scannable code; (5) one or more alphanumeric characters; (6) one or more printed symbols; (7) one or more augmented textual characters or fonts; (8) one or more graphical alterations; or (9) one or more packaging alterations.

11. The AI based counterfeit detection system as in any one of aspects 1-10, wherein a two dimensional (2D) data matrix is depicted in a proximity of one or more of the authentic steganographic features of the product, and wherein the computing instructions of the steganographic app, when executed by the one or more processors, are further configured to cause the one or more processors to: detect whether the product is authentic or counterfeit by analyzing an alignment of the 2D data matrix with respect to the one or more of the authentic steganographic features.

12. The AI based steganographic system as in any one of aspects 1-11, wherein one or more of the plurality of training images each comprise a cropped image having a reduced pixel count compared with a respective original image, the cropped image depicting the one or more authentic steganographic features or the portion of the product devoid of the one or more authentic steganographic features.

13. The AI based steganographic system as in any one of aspects 1-12, wherein one or more of the plurality of training images comprise multiple angles or perspectives of the product.

14. The AI based steganographic system as in any one of aspects 1-13, wherein the computing instructions of the steganographic app, when executed by the one or more processors, are further configured to cause the one or more processors to: render, on a display screen of a computing device, an indication of whether the product is authentic or counterfeit.

15. The AI based steganographic system as in any one of aspects 1-14, wherein the product is classified as counterfeit, and wherein computing instructions of the steganographic app, when executed by the one or more processors, are further configured to cause the one or more processors to: render, on a display screen of a computing device, a visual indication of a pixel-based feature presence or absence of the one or more authentic steganographic features within the new image of the product.

16. An artificial intelligence (AI) based steganographic method for analyzing pixel data of a product to detect product counterfeiting, the AI based steganographic method comprising: training, by one or more processors of a computing device, an AI based imaging model with pixel data of a plurality of training images, the plurality of training images comprising (1) a first subset of images each depicting at least a portion of the product having one or more authentic steganographic features, and (2) a second subset of images each depicting at least a portion of the product devoid of the one or more authentic steganographic features, wherein the AI based imaging model is configured to output one or more image classifications corresponding to a pixel-based feature presence or absence of the one or more authentic steganographic features; receiving, by the one or more processors, a new image of the product, the new image comprising a digital image as captured by a digital camera, and the new image comprising pixel data of at least a portion of the product; analyzing, by the AI based imaging model, the pixel data of the new image for the pixel-based feature presence or absence of the one or more authentic steganographic features to determine an image classification of the product, the image classification selected from the one or more image classifications of the AI based imaging model; and detecting, by the one or more processors, whether the product is authentic or counterfeit based on the image classification.

17. A tangible, non-transitory computer-readable medium storing instructions for analyzing pixel data of a product to detect product counterfeiting, that when executed by one or more processors of a computing device cause the one or more processors of the computing device to: train, by one or more processors of a computing device, an AI based imaging model with pixel data of a plurality of training images, the plurality of training images comprising (1) a first subset of images each depicting at least a portion of the product having one or more authentic steganographic features, and (2) a second subset of images each depicting at least a portion of the product devoid of the one or more authentic steganographic features, wherein the AI based imaging model is configured to output one or more image classifications corresponding to a pixel-based feature presence or absence of the one or more authentic steganographic features; receive, by the one or more processors, a new image of the product, the new image comprising a digital image as captured by a digital camera, and the new image comprising pixel data of at least a portion of the product; analyze, by the AI based imaging model, the pixel data of the new image for the pixel-based feature presence or absence of the one or more authentic steganographic features to determine an image classification of the product, the image classification selected from the one or more image classifications of the AI based imaging model; and detect, by the one or more processors, whether the product is authentic or counterfeit based on the image classification.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An artificial intelligence (AI) based steganographic system configured to analyze pixel data of a product to detect product counterfeiting, wherein the product is three-dimensional, the AI based steganographic system comprising:
    one or more processors;
    a steganographic application (app) comprising computing instructions configured to execute on the one or more processors; and
    an AI based imaging model, accessible by the steganographic app, and trained with pixel data of a plurality of training images comprising (1) a first subset of images each depicting at least a portion of the product having one or more authentic steganographic features, and (2) a second subset of images each depicting at least a portion of the product devoid of the one or more authentic steganographic features,
    wherein the AI based imaging model is configured to output one or more image classifications corresponding to a pixel-based feature presence or absence of the one or more authentic steganographic features,
    wherein the computing instructions of the steganographic app, when executed by the one or more processors, are configured to cause the one or more processors to:
    receive a new image of the product, the new image comprising a digital image as captured by a digital camera, and the new image comprising pixel data of at least a portion of the product,
    apply filters to the pixel data,
    analyze, by the AI based imaging model, the pixel data of the new image for the pixel-based feature presence or absence of the one or more authentic steganographic features to determine an image classification of the product, the image classification selected from the one or more image classifications of the AI based imaging model,
    detect whether the product is authentic or counterfeit based on the image classification,
    determine an error rate for the image classification of the new image, and
    update the filters to minimize the error rate.

2. The AI based steganographic system of claim 1, wherein the computing instructions of the steganographic app, when executed by the one or more processors, are further configured to cause the one or more processors to:
    select a set of the one or more authentic steganographic features for printing on a different version of the product, and
    generate a print submission for printing or augmenting, by a printer on a substrate of the different version of the product, the set of the one or more authentic steganographic features.

3. The AI based steganographic system of claim 1, wherein the one or more authentic steganographic features of the first subset of images are generated by selecting or altering one or more predetermined steganographic features.

4. The AI based steganographic system of claim 3, wherein the second subset of images comprise synthetic images generated by deleting or annotating at least a portion of the one or more predetermined steganographic features.

5. The AI based steganographic system of claim 1, wherein the second subset of images comprise synthetic images generated by deleting or annotating at least a portion of the one or more authentic steganographic features.

6. The AI based steganographic system of claim 1, wherein each of the second subset of images comprise a visual or pixel difference from the each of the first subset of images based on the pixel-based feature presence or absence of the one or more authentic steganographic features.

7. The AI based steganographic system of claim 6, wherein the visual or pixel difference is generated through one or more iterations of a generative adversarial network (GAN).

8. The AI based steganographic system of claim 1, wherein the one or more image classifications comprise one or more of: (1) a counterfeit product classification; and (2) an authentic product classification.

9. The AI based steganographic system of claim 1, wherein the plurality of training images further comprises a third subset of images each depicting at least a portion of the product having one or more real counterfeit features, and where the AI based imaging model is further trained with the third subset of images.

10. The AI based counterfeit detection system of claim 1, wherein the one or more authentic steganographic features comprise at least one of: (1) one or more portions of a barcode; (2) one or more portions of a QR code; (3) one or more portions of a data matrix code; (4) one or more portions of a scannable code; (5) one or more alphanumeric characters; (6) one or more printed symbols; (7) one or more augmented textual characters or fonts; (8) one or more graphical alterations; or (9) one or more packaging alterations.

11. The AI based counterfeit detection system of claim 1, wherein a two dimensional (2D) data matrix is depicted alongside one or more of the authentic steganographic features of the product, and wherein the computing instructions of the steganographic app, when executed by the one or more processors, are further configured to cause the one or more processors to:

detect whether the product is authentic or counterfeit by analyzing an alignment of the 2D data matrix with respect to the one or more of the authentic steganographic features.

12. The AI based steganographic system of claim 1, wherein one or more of the plurality of training images each comprise a cropped image having a reduced pixel count compared with a respective original image, the cropped image depicting the one or more authentic steganographic features or the portion of the product devoid of the one or more authentic steganographic features.

13. The AI based steganographic system of claim 1, wherein one or more of the plurality of training images comprise multiple angles or perspectives of the product.

14. The AI based steganographic system of claim 1, wherein the computing instructions of the steganographic app, when executed by the one or more processors, are further configured to cause the one or more processors to:

render, on a display screen of a computing device, an indication of whether the product is authentic or counterfeit.

15. The AI based steganographic system of claim 1, wherein the product is classified as counterfeit, and wherein computing instructions of the steganographic app, when executed by the one or more processors, are further configured to cause the one or more processors to:

render, on a display screen of a computing device, a visual indication of a pixel-based feature presence or absence of the one or more authentic steganographic features within the new image of the product.

16. An artificial intelligence (AI) based steganographic method for analyzing pixel data of a product to detect product counterfeiting, wherein the product is three-dimensional, the AI based steganographic method comprising:

training, by one or more processors of a computing device, an AI based imaging model with pixel data of a plurality of training images, the plurality of training images comprising (1) a first subset of images each depicting at least a portion of the product having one or more authentic steganographic features, and (2) a second subset of images each depicting at least a portion of the product devoid of the one or more authentic steganographic features, wherein the AI based imaging model is configured to output one or more image classifications corresponding to a pixel-based feature presence or absence of the one or more authentic steganographic features;

receiving, by the one or more processors, a new image of the product, the new image comprising a digital image as captured by a digital camera, and the new image comprising pixel data of at least a portion of the product;

applying filters to the pixel data;

analyzing, by the AI based imaging model, the pixel data of the new image for the pixel-based feature presence or absence of the one or more authentic steganographic features to determine an image classification of the product, the image classification selected from the one or more image classifications of the AI based imaging model;

detecting, by the one or more processors, whether the product is authentic or counterfeit based on the image classification;

determining an error rate for the image classification of the new image; and updating the filters to minimize the error rate.

17. A tangible, non-transitory computer-readable medium storing instructions for analyzing pixel data of a product to detect product counterfeiting, wherein the product is three-dimensional, that when executed by one or more processors of a computing device cause the one or more processors of the computing device to:

train, by one or more processors of a computing device, an AI based imaging model with pixel data of a plurality of training images, the plurality of training images comprising (1) a first subset of images each depicting at least a portion of the product having one or more authentic steganographic features, and (2) a second subset of images each depicting at least a portion of the product devoid of the one or more authentic steganographic features, wherein the AI based imaging model is configured to output one or more image classifications corresponding to a pixel-based feature presence or absence of the one or more authentic steganographic features;

receive, by the one or more processors, a new image of the product, the new image comprising a digital image as captured by a digital camera, and the new image comprising pixel data of at least a portion of the product;

apply filters to the pixel data;

analyze, by the AI based imaging model, the pixel data of the new image for the pixel-based feature presence or absence of the one or more authentic steganographic features to determine an image classification of the product, the image classification selected from the one or more image classifications of the AI based imaging model;

detect, by the one or more processors, whether the product is authentic or counterfeit based on the image classification;

determine an error rate for the image classification of the new image; and update the filters to minimize the error rate.

18. The AI based steganographic system of claim 1, wherein the pixel data comprises red-green-blue data.

19. The AI based steganographic system of claim 1, wherein the AI based steganographic system is a convolutional neural network (CNN) model.

20. The AI based steganographic system of claim 1, wherein the filters are initialized with random values and wherein the values of the filters are updated based on the determined error rate such that values of the filters are adjusted in proportion to their contribution to the determined error rate.

21. The AI based on steganographic system of claim 1, wherein the computing instructions of the steganographic app, when executed by the one or more processors, are configured to cause the one or more processors to apply the filters to the pixel data including to generate the filters based on different portions of the new image and to slide the filters across the pixel data of the new image to generate a feature map.

22. The AI based on steganographic system of claim 1, wherein the computing instructions of the steganographic app, when executed by the one or more processors, are configured to cause the one or more processors to determine the error rate based on a comparison of the image classification of the new image selected from the one or more image classifications of the AI based imaging model with an actual classification of the new image.

\* \* \* \* \*